(12) United States Patent
Ang et al.

(10) Patent No.: US 11,212,067 B2
(45) Date of Patent: *Dec. 28, 2021

(54) CONFIGURABLE BI-DIRECTIONAL TIME DIVISION DUPLEX (TDD) SUBFRAME STRUCTURE

(71) Applicant: QUALCOMM Incorporated, San Diego, CA (US)

(72) Inventors: Peter Pui Lok Ang, San Diego, CA (US); Jing Jiang, San Diego, CA (US); Tingfang Ji, San Diego, CA (US); Jeremy Lin, San Diego, CA (US); Joseph Binamira Soriaga, San Diego, CA (US); Krishna Kiran Mukkavilli, San Diego, CA (US); John Edward Smee, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 92 days.

This patent is subject to a terminal disclaimer.

(21) Appl. No.: 16/708,282

(22) Filed: Dec. 9, 2019

(65) Prior Publication Data

US 2020/0112421 A1 Apr. 9, 2020

Related U.S. Application Data

(63) Continuation of application No. 15/043,395, filed on Feb. 12, 2016, now Pat. No. 10,505,701.
(Continued)

(51) Int. Cl.
*H04L 5/14* (2006.01)
*H04L 5/00* (2006.01)
*H04W 72/04* (2009.01)

(52) U.S. Cl.
CPC .............. *H04L 5/14* (2013.01); *H04L 5/0028* (2013.01); *H04L 5/1469* (2013.01); *H04W 72/042* (2013.01); *H04W 72/0413* (2013.01)

(58) Field of Classification Search
None
See application file for complete search history.

(56) References Cited

U.S. PATENT DOCUMENTS

| 10,505,701 B2 | 12/2019 | Ang et al. |
| 2012/0230273 A1 | 9/2012 | He et al. |

(Continued)

FOREIGN PATENT DOCUMENTS

| CN | 103702409 A | 4/2014 |
| CN | 103716143 A | 4/2014 |

(Continued)

OTHER PUBLICATIONS

Lahetkangas, et al. "On the TDD Subframe Structure for Beyond 4G Radio Access Network" Future Network & MobileSummit 2013 Conference. (Year: 2013).*

(Continued)

*Primary Examiner* — Jeffrey M Rutkowski
*Assistant Examiner* — Basil Ma
(74) *Attorney, Agent, or Firm* — Loza & Loza, LLP/Qualcomm

(57) ABSTRACT

Aspects of the present disclosure provide a configurable bi-directional time division duplex (TDD) subframe structure. The configurable subframe structure includes a downlink control portion, an uplink control portion, an uplink data portion and a downlink data portion. A current subframe for communication between a scheduling entity and a set of one or more subordinate entities is produced by determining a desired ratio of uplink information to downlink information (Continued)

for the current subframe and configuring the configurable subframe structure with the desired ratio.

30 Claims, 15 Drawing Sheets

Related U.S. Application Data

(60) Provisional application No. 62/202,342, filed on Aug. 7, 2015.

(56) References Cited

U.S. PATENT DOCUMENTS

| | | |
|---|---|---|
| 2014/0198773 A1 | 7/2014 | Yin et al. |
| 2015/0043399 A1 | 2/2015 | Yin et al. |
| 2015/0282167 A1 | 10/2015 | Lahetkangas et al. |
| 2016/0020891 A1 | 1/2016 | Jung et al. |
| 2017/0223671 A1 | 8/2017 | He et al. |
| 2017/0303306 A1 | 10/2017 | Lee et al. |

FOREIGN PATENT DOCUMENTS

| | | |
|---|---|---|
| CN | 104205968 A | 12/2014 |
| WO | 2014090005 A1 | 6/2014 |

OTHER PUBLICATIONS

Parent—U.S. Pat. No. 10,505,701 Case U.S. Appl. No. 15/043,395 Applicant Remarks of Apr. 22, 2019 and Notice of Allowance dated Aug. 9, 2019. (Year: 2019).*
International Search Report and Written Opinion—PCT/US2016/045429—ISA/EPO—dated Oct. 11, 2016.
Lahetkangas E., et al., "On the Flexible 5G Dense Deployment Air Interface for Mobile Broadband," 1st International Conference on 5G for Ubiquitous Connectivity, ICST, Nov. 26, 2014 (Nov. 26, 2014), pp. 57-61, XP032735066, DOI: 10.4108/ICST.5GU.2014.258101 [retrieved on Feb. 11, 2015].
Lahetkangas E., et al., "On the TDD Subframe Structure for Beyond 4G Radio Access Network", 2013 Future Network & Mobile Summit, Article No. 6633569, Jul. 3, 2013 (Jul. 3, 2013), pp. 1-10, XP055335904, Title; Section 3; Figures 3, 6-7.
Taha, A.M. et al., LTE, LTE-Advanced and WiMAX: Towards IMT-Advanced Networks 2012 Wiley, pp. 147-151 (Year: 2012).

* cited by examiner

CONFIGURABLE BI-DIRECTIONAL TIME DIVISION DUPLEX (TDD) SUBFRAME STRUCTURE

PRIORITY CLAIM

The present Application for Patent is a Continuation of Non-Provisional application Ser. No. 15/043,395 filed in the U.S. Patent and Trademark Office on Feb. 12, 2016, the entire content of which is incorporated herein by reference as if fully set forth below in its entirety and for all applicable purposes. Non-Provisional application Ser. No. 15/043,395 claims priority to Provisional Application No. 62/202,342 entitled "Configurable Bi-Directional Time Division Duplex (TDD) Frame Structure" filed Aug. 7, 2015, and assigned to the assignee hereof and hereby expressly incorporated by reference herein.

TECHNICAL FIELD

Aspects of the present disclosure relate generally to wireless communication systems, and more particularly, to interleaving control and data portions of different subframes for both uplink and downlink transmissions in a time division duplex (TDD) subframe structure.

BACKGROUND

Wireless communication networks are widely deployed to provide various communication services such as telephony, video, data, messaging, broadcasts, and so on. Typical wireless communication systems may employ multiple-access technologies capable of supporting communication with multiple users by sharing available system resources (e.g., bandwidth, transmit power). Examples of multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. Examples of telecommunication standards include Long Term Evolution (LTE) and LTE-Advanced (LTE-A), which include a set of enhancements to the Universal Mobile Telecommunications System (UMTS) mobile standard promulgated by Third Generation Partnership Project (3GPP). LTE-A is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology.

However, as the demand for mobile broadband access continues to increase, there exists a need for further improvements in multiple access technologies technology. For example, the spectrum allocated to wireless communication networks employing multiple access technology is being (or is expected to be) allocated in such a way that paired carriers, utilized in many existing frequency division duplex (FDD) systems, are either not available, or not available in matched bandwidth configurations. Accordingly, time division duplex (TDD) carriers are expected to be utilized in many future deployments for wireless communication systems.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide a configurable bi-directional time division duplex (TDD) subframe structure including a downlink control portion, an uplink control portion, an uplink data portion and a downlink data portion. The configurable subframe structure may be utilized to produce a current subframe based on a desired ratio of uplink information to downlink information.

In one aspect of the disclosure, the disclosure provides a method of wireless communication by a subordinate entity in a wireless communication network. The method includes communicating between the subordinate entity and a scheduling entity utilizing a time division duplex (TDD) carrier. The TDD carrier includes a plurality of frames, each including a plurality of subframes with a transmission time interval (TTI). Each of the plurality of subframes utilizes a configurable subframe structure of TTI duration. The configurable subframe structure includes a downlink control portion, an uplink control portion, an uplink data portion, and a downlink data portion encapsulated therein. The method further includes separately identifying a respective structure within each of the plurality of subframes utilizing the configurable subframe structure. For a current subframe of the plurality of subframes of TTI duration, separately identifying the respective structure further includes determining a ratio between uplink information and downlink information within the current subframe, and identifying a current structure of the current subframe based on the ratio. The method further includes communicating between the subordinate entity and the scheduling entity using the current subframe.

Another aspect of the disclosure provides a subordinate entity in a wireless network. The subordinate entity includes a processor, a memory communicatively coupled to the processor, and a transceiver communicatively coupled to the processor and configured to communicate with a scheduling entity utilizing a time division duplex (TDD) carrier. The TDD carrier includes a plurality of frames, each including a plurality of subframes with a transmission time interval (TTI). Each of the plurality of subframes utilizes a configurable subframe structure of TTI duration. The configurable subframe structure includes a downlink control portion, an uplink control portion, an uplink data portion, and a downlink data portion encapsulated therein. The processor and the memory are configured to separately identify a respective structure within each of the plurality of subframes utilizing the configurable subframe structure. For a current subframe of the plurality of subframes of TTI duration, separately identifying the respective structure further includes determining a ratio between uplink information and downlink information within the current subframe, and identifying a current structure of the current subframe based on the ratio.

The processor and the memory are further configured to communicate between the subordinate entity and the scheduling entity using the current subframe via the transceiver.

Another aspect of the disclosure provides a subordinate entity apparatus in a wireless communication network including means for communicating between the subordinate entity and a scheduling entity utilizing a time division duplex (TDD) carrier. The TDD carrier includes a plurality of frames, each including a plurality of subframes with a transmission time interval (TTI). Each of the plurality of subframes utilizes a configurable subframe structure of TTI duration. The configurable subframe structure includes a downlink control portion, an uplink control portion, an uplink data portion, and a downlink data portion encapsulated therein. The subordinate entity apparatus further includes means for separately identifying a respective structure within each of the plurality of subframes utilizing the configurable subframe structure. For a current subframe of the plurality of subframes of TTI duration, the means for separately identifying the respective structure further includes means for determining a ratio between uplink information and downlink information within the current subframe, and means for identifying a current structure of the current subframe based on the ratio. The subordinate entity apparatus further includes means for communicating between the subordinate entity and the scheduling entity using the current subframe.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
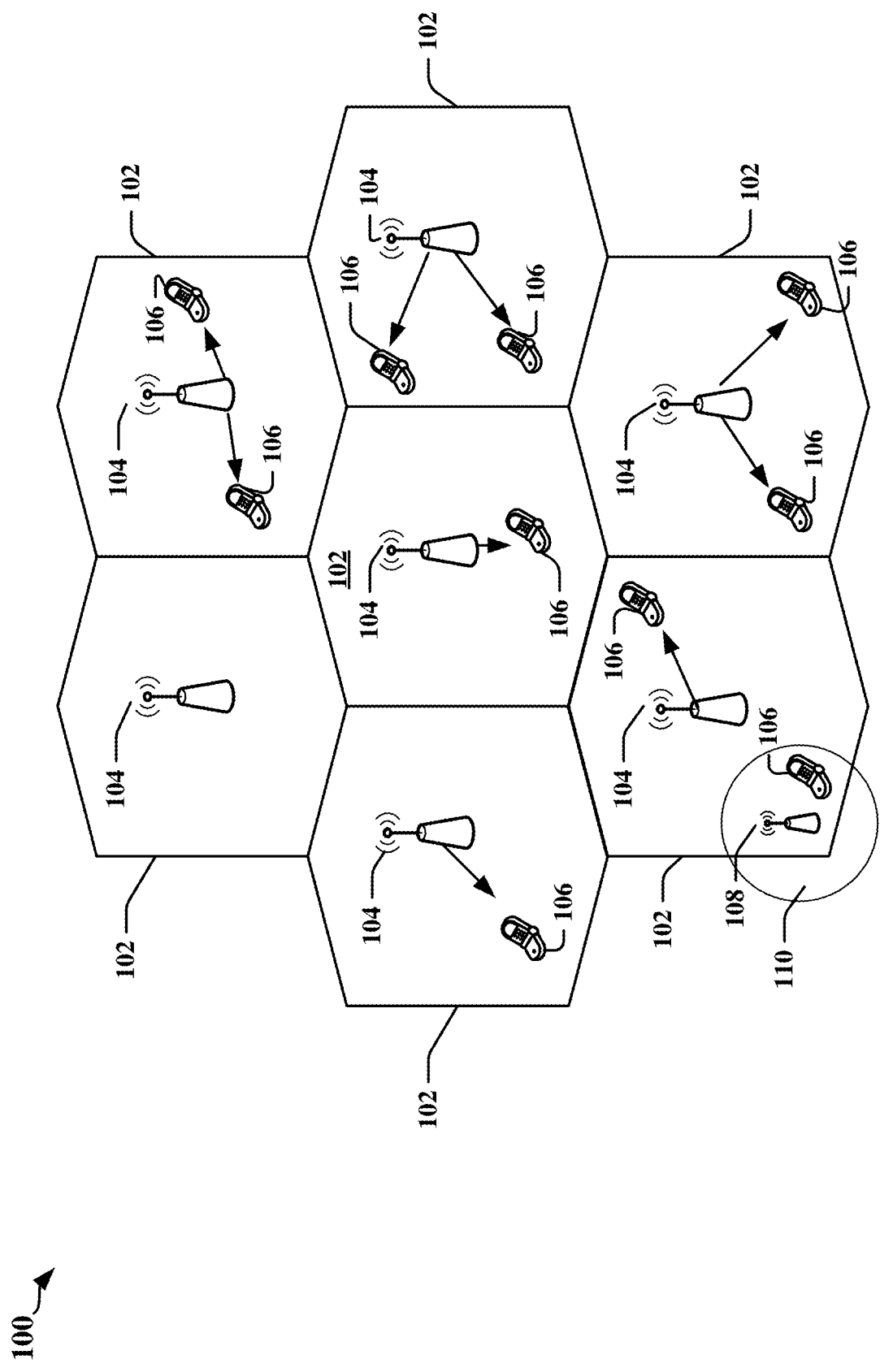
FIG. 1 is a diagram illustrating an example of a network architecture.

The various concepts presented throughout this disclosure may be implemented across a broad variety of telecommunication systems, network architectures, and communication standards. In order to illustrate some of the entities or devices described throughout the present disclosure, FIG. 1 is a diagram illustrating a generalized example of a wireless communication network 100. In this example, the wireless communication network 100 is divided into a number of cellular regions (cells) 102. In the context of a multiple access network, channel resources may generally be scheduled, and each entity may be synchronous. That is, each node utilizing the network may coordinate its usage of the resources such that transmissions are only made during the allocated portion of the frame, and the time of each allocated portion is synchronized among the different nodes. One node in each cellular region 102/110 acts as a scheduling entity.

Each scheduling entity 104/108 may be a base station or access point, or a user equipment (UE) 106 in a device-to-device (D2D) and/or mesh network. The scheduling entity 104/108 manages the resources on the carrier and assigns resources to other users of the channel, including subordinate entities, such as one or more UEs 106 in the cellular network 100. The scheduling entities 104 are responsible for all radio related functions including radio bearer control, admission control, mobility control, scheduling, security, and connectivity to a centralized controller and/or gateway. There is no centralized controller in this example of a network 100, but a centralized controller may be used in alternative configurations.

One or more lower power class scheduling entities 108 may have a cellular region 110 that overlaps with one or more other cellular regions (cells) 102. The lower power class scheduling entity 108 may be a femto cell, pico cell, micro cell, remote radio head, or in some instances, another UE 106. The macro scheduling entities 104 are each assigned to a respective cell 102 and are configured to provide an access point to a core network for all the UEs 106 in the cells 102.

The modulation and multiple access scheme employed by the network 100 may vary depending on the particular telecommunications standard being deployed. In some radio access networks, such as those defined in LTE standards, orthogonal frequency division multiplexing (OFDM) is used on the downlink (DL) and single carrier frequency division multiple access (SC-FDMA) is used on the uplink (UL) to support both frequency division duplexing (FDD) and time division duplexing (TDD). As those skilled in the art will readily appreciate from the detailed description to follow, the various concepts presented herein are well suited for various applications including telecommunication standards employing other modulation and multiple access techniques. By way of example, these concepts may be employed in 5G, LTE, or Evolution-Data Optimized (EV-DO). EV-DO is an air interface standard promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 is described in documents from the 3GPP2 organization. The actual wireless communication standard and the multiple access technology employed will depend on the specific application and the overall design constraints imposed on the system.

The scheduling entities 104 may have multiple antennas supporting MIMO technology. The use of MIMO technology enables the scheduling entities 104 to exploit the spatial domain to support spatial multiplexing, beamforming, and transmit diversity. Spatial multiplexing may be used to transmit different streams of data simultaneously on the same frequency. The data steams may be transmitted to a single UE 106 to increase the data rate or to multiple UEs 106 to increase the overall system capacity. This is achieved by spatially precoding each data stream (i.e., applying a scaling of an amplitude and a phase) and then transmitting each spatially precoded stream through multiple transmit antennas on the downlink (DL). The spatially precoded data streams arrive at the UE(s) 106 with different spatial signatures, which enables each of the UE(s) 106 to recover the one or more data streams destined for that UE 106. On the uplink (UL), each UE 106 transmits a spatially precoded data stream, which enables the scheduling entity 104 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Certain aspects of a wireless communication network described herein may relate to a system supporting OFDM on the DL. OFDM is a spread-spectrum technique that modulates data over a number of subcarriers within an OFDM symbol. The subcarriers are spaced apart at precise frequencies. The spacing provides orthogonality that enables a receiver to recover the data from the subcarriers. In the time domain, a guard interval (e.g., cyclic prefix) may be added to each OFDM symbol to combat inter-OFDM-symbol interference. In some examples, the UL may use SC-FDMA in the form of a Discrete Fourier Transform (DFT)-spread OFDM signal to compensate for high peak-to-average power ratio (PAPR). However, those of ordinary skill in the art will recognize that any suitable modulation and multiple access scheme may be utilized for uplink and downlink communication.

Figure 2:
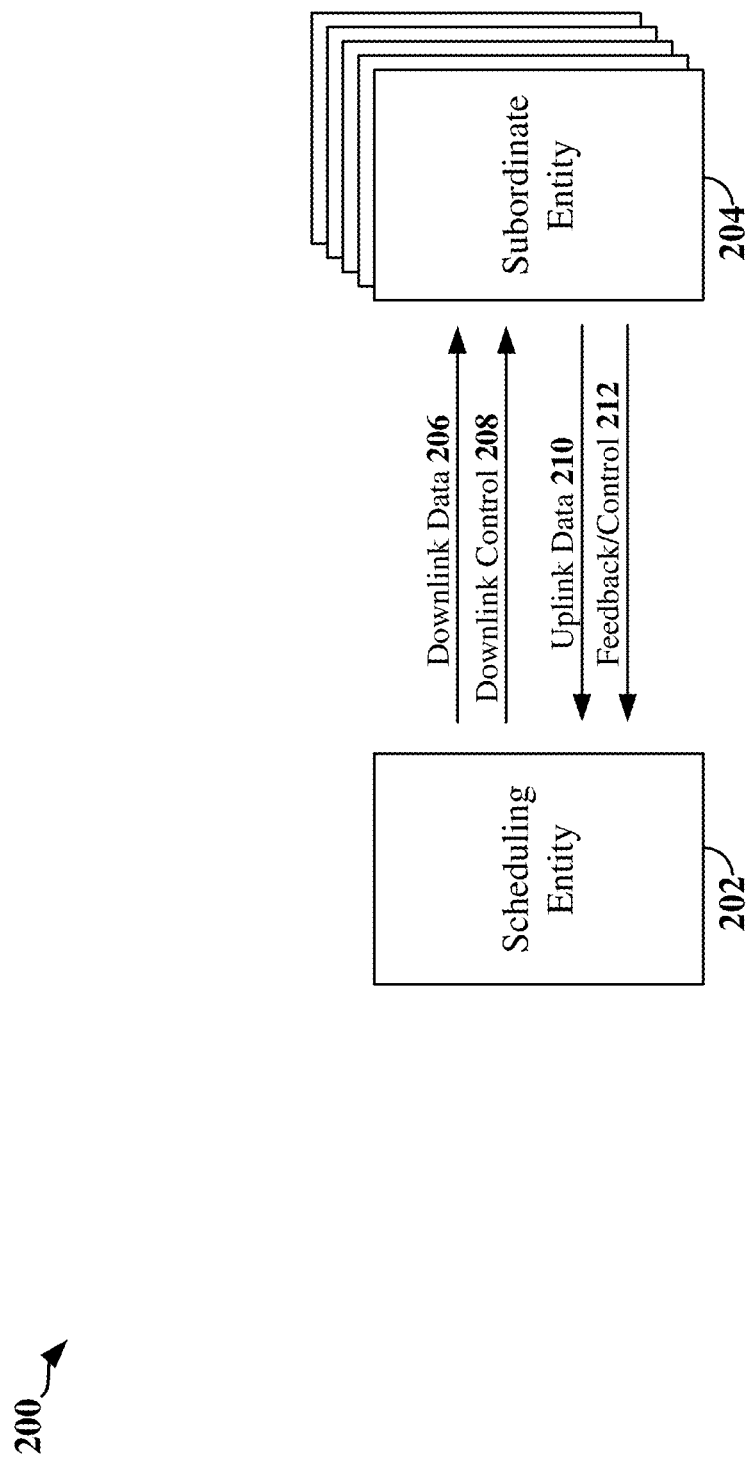
FIG. 2 is a block diagram conceptually illustrating an example of a scheduling entity communicating with one or more subordinate entities according to some embodiments.

Referring now to FIG. 2, a block diagram illustrates an exemplary scheduling entity 202 in wireless communication with a plurality of subordinate entities 204. The scheduling entity 202 transmits downlink data channel(s) 206 and downlink control channel(s) 208, while the subordinate entities 204 transmit uplink data channel(s) 210 and uplink control channel(s) 212. Of course, the channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other control and feedback channels.

In accordance with aspects of the present disclosure, the term downlink (DL) may refer to a point-to-multipoint transmission originating at the scheduling entity 202. In addition, the term uplink (UL) may refer to a point-to-point transmission originating at a subordinate entity 204.

Broadly, the scheduling entity 202 is a node or device responsible for scheduling traffic in a wireless communication network, including the downlink transmissions and, in some examples, uplink data 210 from one or more subordinate entities 204 to the scheduling entity 202. A scheduling entity 202 may be, or may reside within, a base station, a network node, a user equipment (UE), an access terminal, or any suitable node or peer in a wireless communication network.

Broadly, the subordinate entity 204 is a node or device that receives scheduling control information, including but not limited to scheduling grants, synchronization or timing information, or other control information from another entity in the wireless communication network such as the scheduling entity 202. A subordinate entity may be, or may reside within, a base station, a network node, a UE, an access terminal, or any suitable node or peer in a wireless communication network.

As illustrated in FIG. 2, the scheduling entity 202 may transmit downlink data 206 to one or more subordinate entities 204. In addition, the subordinate entities 204 may transmit uplink data 210 to the scheduling entity 202. In accordance with aspects of the disclosure, the uplink data 210 and/or downlink data 206 may be transmitted in transmission time intervals (TTIs). As used herein, the term TTI refers to the period in which a block of data, corresponding to the smallest collection of symbols to be processed at the Media Access Control (MAC) layer and above, is transferred by the physical layer onto the radio interface. In accordance with aspects of the disclosure, a TTI is equal to the duration of a subframe. Thus, as further used herein, the term subframe refers to an encapsulated set of information sent within a single TTI that is capable of being independently decoded. In various aspects of the disclosure, multiple subframes are grouped together to form a single frame. For example, in LTE, the TTI (subframe duration) is set to 1 ms, whereas the frame duration is set to 10 ms, corresponding to 10 subframes. However, within the scope of the present disclosure, a subframe may have a duration of 250 μs, 500 μs, 1 ms, or any suitable duration. Similarly, any suitable number of subframes may occupy a frame. Frames are generally utilized by upper Open Systems Interconnection (OSI) layers for synchronization and other purposes.

In one example, the scheduling entity 202 may multiplex downlink data for a set of subordinate entities (i.e., two or more subordinate entities) within a single subframe. For example, the scheduling entity 202 may multiplex downlink data to the set of subordinate entities using time division multiplexing, frequency division multiplexing (e.g., OFDM), code division multiplexing, and/or any suitable multiplexing scheme known to those of ordinary skill in the art. Likewise, any suitable multiple access scheme may be utilized to combine uplink data from multiple subordinate entities 204 within a single subframe.

The scheduling entity 202 may further broadcast downlink control channel(s) 208 to one or more subordinate entities 204. The downlink control channel(s) 208 may include in some examples a physical downlink control channel (PDCCH), a physical downlink shared channel (PDSCH) and/or any other control channels or pilots, such as the Channel State Information—Reference Signal (CSI-RS) pilot. In still a further example, the downlink control channel(s) 208 may include acknowledgement information (e.g., acknowledged (ACK)/not acknowledged (NACK) packets) indicating whether the uplink data 210 in one or more subframes was received correctly at the scheduling entity 202. For example, a data packet may include verification bits, such as a checksum and/or a cyclic redundancy check (CRC). Accordingly, a device receiving a data packet may receive and decode the data packet and verify the integrity of the received and decoded packet in accordance with the verification bits. When the verification succeeds, a positive acknowledgment (ACK) may be transmitted; whereas when the verification fails, a negative acknowledgment (NACK) may be transmitted.

Furthermore, each of the subordinate entities 204 may transmit uplink control channel(s) 212 to the scheduling entity 202. The uplink control channel(s) 212 may include in some examples a physical uplink control channel (PUCCH), random access channel (RACH), scheduling request (SR), sounding reference signal (SRS), channel quality indicator (CQI), channel state feedback information, buffer status information, or any other suitable control information or signaling. In an aspect of the disclosure, the uplink control channel(s) 212 may include a request for the scheduling entity 202 to schedule uplink transmissions. Here, in response to the request transmitted on the uplink control channel(s) 212, the scheduling entity 202 may transmit in the downlink control channel(s) 208 information that may schedule the TTI with uplink packets. In still a further example, the uplink control channel(s) 212 may include acknowledgement information (e.g., acknowledged (ACK)/not acknowledged (NACK) packets) indicating whether the downlink data 206 in one or more subframes was received correctly at the subordinate entity 204.

Figure 3:
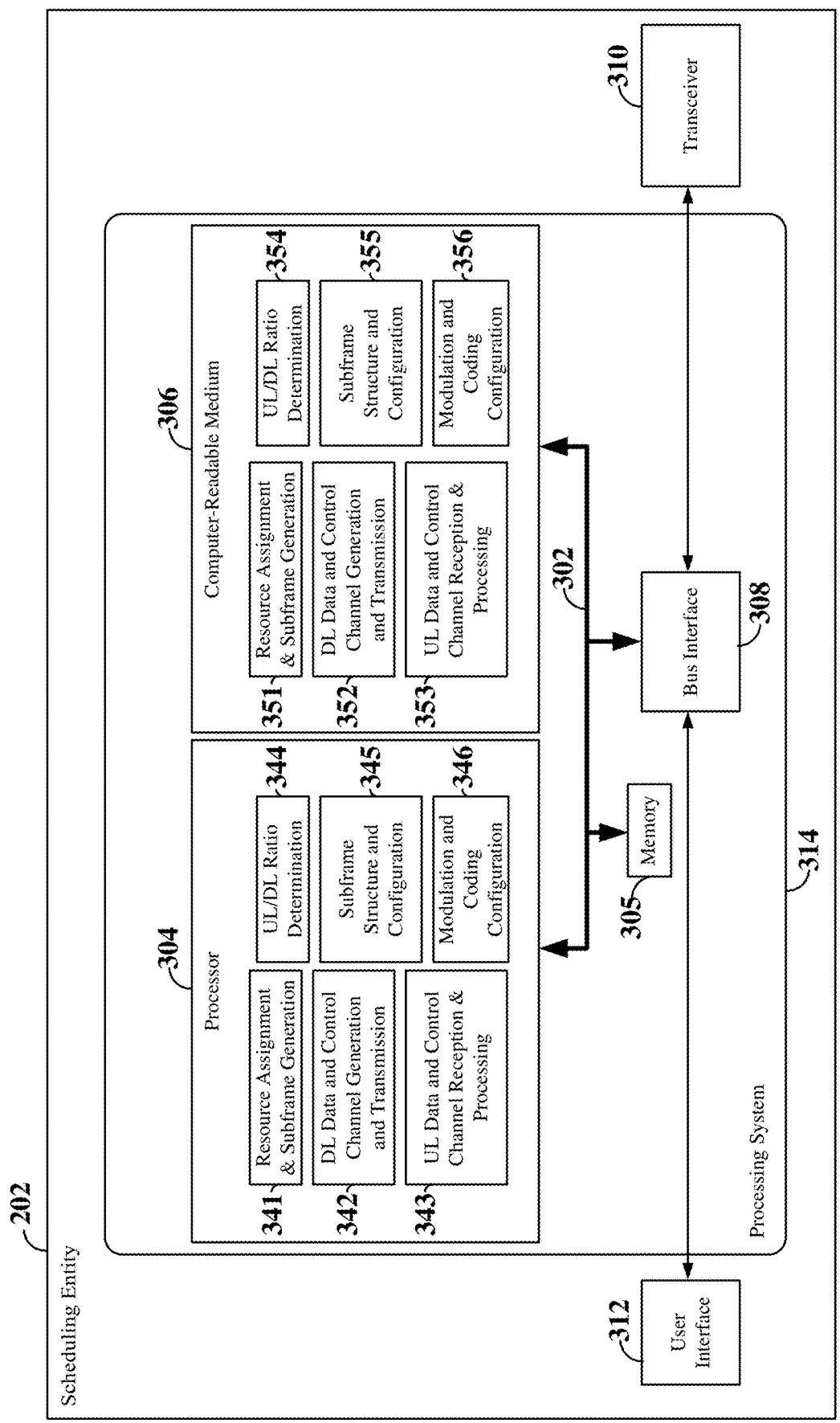
FIG. 3 is a block diagram illustrating an example of a hardware implementation for a scheduling entity employing a processing system according to some embodiments.

FIG. 3 is a conceptual diagram illustrating an example of a hardware implementation for an exemplary scheduling entity 202 employing a processing system 314. In accordance with various aspects of the disclosure, an element, or any portion of an element, or any combination of elements may be implemented with a processing system 314 that includes one or more processors 304.

In various aspects of the disclosure, the scheduling entity 202 may be any suitable radio transceiver apparatus, and in some examples, may be embodied in a base station (BS), a base transceiver station (BTS), a radio base station, a radio transceiver, a transceiver function, a basic service set (BSS), an extended service set (ESS), an access point (AP), a Node B, an eNode B (eNB), mesh node, relay, or some other suitable terminology. Within the present document, a base station may be referred to as a scheduling entity, indicating that the base station provides scheduling information to one or more subordinate entities. Such a base station may provide a wireless access point to a core network for any number of subordinate entities.

In other examples, the scheduling entity 202 may be embodied by a wireless user equipment (UE). Examples of a UE include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, an entertainment device, a vehicle component, a wearable computing device (e.g., a smart watch, a health or fitness tracker, etc.), an appliance, a sensor, a vending machine, or any other similar functioning device. The UE may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a UE may be referred to either as a scheduling entity, or a subordinate entity. That is, in various aspects of the present disclosure, a wireless UE may operate as a scheduling entity providing scheduling information to one or more subordinate entities, or may operate as a subordinate entity, operating in accordance with scheduling information provided by a scheduling entity.

Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 304, as utilized in a scheduling entity 202, may be used to implement any one or more of the processes described below.

In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 may also be used for storing data that is manipulated by the processor 304 when executing software.

In some aspects of the disclosure, the processor 304 may include resource assignment and subframe generation circuitry 341, configured to generate, schedule, and modify a resource assignment or grant of time-frequency resources. For example, the resource assignment and subframe control circuitry 341 may generate one or more time division duplex (TDD) subframes, each including time-frequency resources assigned to carry data and/or control information to and/or from multiple subordinate entities. The resource assignment and subframe generation circuitry 341 may operate in coordination with resource assignment and subframe generation software 351.

The processor 304 may further include downlink (DL) data and control channel generation and transmission circuitry 342, configured to generate and transmit downlink data and control channels. The DL data and control channel generation and transmission circuitry 342 may operate in coordination with the resource assignment and subframe control circuitry 341 to schedule the DL data and/or control information and to place the DL data and/or control information onto a time division duplex (TDD) carrier within one or more subframes generated by the resource assignment and subframe generation circuitry 341 in accordance with the resources assigned to the DL data and/or control information. The DL data and control channel generation and transmission circuitry 342 may further operate in coordination with DL data and control channel generation and transmission software 352.

The processor 304 may further include uplink (UL) data and control channel reception and processing circuitry 343, configured to receive and process uplink control channels and uplink data channels from one or more subordinate entities. In some examples, the UL data and control channel reception and processing circuitry 343 may be configured to receive scheduling requests from one or more subordinate entities, the scheduling requests being configured to request a grant of time-frequency resources for uplink user data transmissions. In other examples, the UL data and control channel reception and processing circuitry 343 may be configured to receive and process acknowledgement information (e.g., acknowledged/not acknowledged packets) from one or more subordinate entities. The UL data and control channel reception and processing circuitry 343 may operate in coordination with the resource assignment and subframe generation circuitry 341 to schedule UL data transmissions, DL data transmissions and/or DL data retransmissions in accordance with the received UL control channel information. The UL data and control channel reception and processing circuitry 343 may further operate in coordination with UL data and control channel reception and processing software 353.

The processor 304 may further include uplink/downlink (UL/DL) ratio determination circuitry 344, configured for determining a desired ratio of uplink information to downlink information to be included in a current subframe and/or one or more upcoming (e.g., future scheduled) subframes. The UL/DL ratio is used to configure the structure of the current subframe and/or one or more future subframes to be scheduled by the scheduling entity 202. The UL/DL ratio determination circuitry 344 may further provide the selected UL/DL ratio for the one or more subframes to the resource assignment and subframe control circuitry 341 to schedule the one or more subframes in accordance with the selected UL/DL ratio and to the DL data and control channel generation and transmission circuitry 342 to provide the selected UL/DL ratio to the one or more subordinate entities.

The UL/DL ratio may be determined upon initialization of the scheduling entity or periodically based on, for example, the amount and/or type of data to be transmitted in the wireless communication network. In addition, the desired UL/DL ratio may be determined based on a number of different factors, including, but not limited to, traffic statistics (short, medium or long-term), UL and/or DL capacity and a throughput target. In an aspect of the disclosure, the traffic (in bits) that is sent over the UL and the DL can be graphed over time to produce traffic statistics that can be used to determine the desired UL/DL ratio. For example, if the traffic statistics indicate that there has been more DL traffic than UL traffic (in the short, medium or long-term), the UL/DL ratio may be set to allocate more resources within a subframe to DL traffic than UL traffic. As another example, if the traffic statistics measured over a recent/current time period indicate that there has been more UL traffic than over a previous time period, the UL/DL ratio may be increased to allocate additional resources to the UL traffic. In another aspect of the disclosure, the DL capacity and/or UL capacity may be determined and used to set the desired UL/DL ratio. For example, if the DL capacity is low, the desired UL/DL ratio may be increased to reduce the number of resources allocated to the DL traffic. In still another aspect of the disclosure, the throughput target of the UL may be determined and used to set the desired UL/DL ratio. For example, if the throughput target of the UL is high, the desired UL/DL ratio may be decreased to allocate additional resources to the UL traffic. The UL/DL ratio determination circuitry 344 may operate in coordination with UL/DL ratio determination software 354.

The processor 304 may further include subframe structure and configuration circuitry 345, configured to provide a configurable bi-directional (UL/DL) subframe structure and to configure the bi-directional UL/DL subframe structure to produce a subframe structure having the desired ratio of UL/DL information. The bi-directional subframe structure may include UL portions and DL portions that are configurable to achieve the desired ratio of UL/DL information (control and data) within the subframe. The subframe structure and configuration circuitry 345 may further operate in conjunction with the resource assignment and subframe control circuitry 341 and the DL data and control channel generation and transmission circuitry 342 to generate and transmit one or more subframes in the structure produced by the subframe structure and configuration circuitry 345. The subframe structure and configuration circuitry 345 may also operate in coordination with subframe structure and configuration software 355.

The processor 304 may further include modulation and coding configuration circuitry 346, configured for determining a modulation and coding scheme (MCS) to utilize for downlink transmissions and/or a MCS for a subordinate entity to utilize for uplink transmissions. The modulation and coding configuration circuitry 346 may operate in coordination with modulation and coding configuration software 356.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 4:
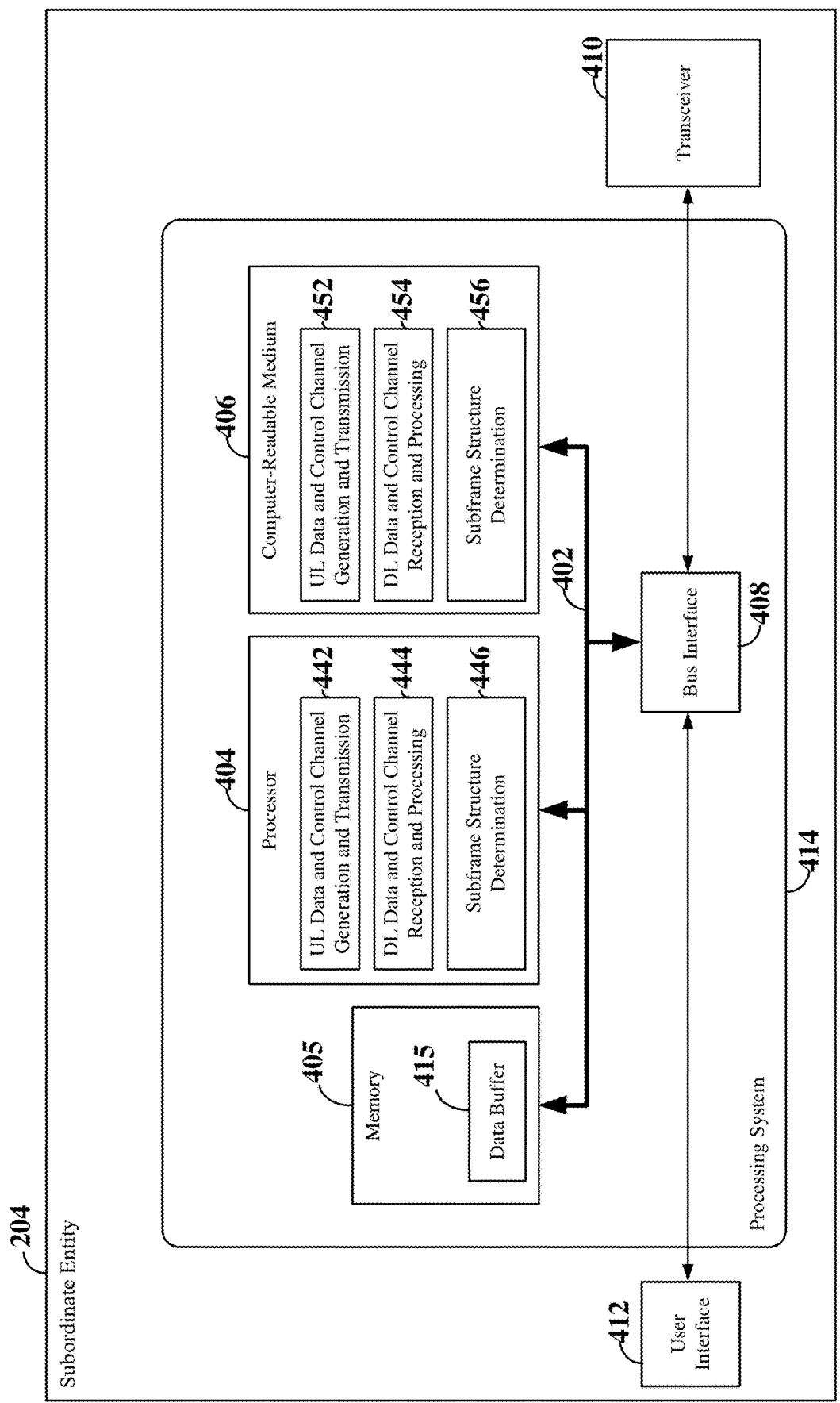
FIG. 4 is a block diagram illustrating an example of a hardware implementation for a subordinate entity employing a processing system according to some embodiments.

FIG. 4 is a conceptual diagram illustrating an example of a hardware implementation for an exemplary subordinate entity 204 employing a processing system 414. In accordance with various aspects of the disclosure, an element, or any portion of an element, or any combination of elements may be implemented with a processing system 414 that includes one or more processors 404.

The processing system 414 may be substantially the same as the processing system 314 illustrated in FIG. 3, including a bus interface 408, a bus 402, memory 405, a processor 404, and a computer-readable medium 406. Furthermore, the subordinate entity 204 may include a user interface 412 and a transceiver 410 substantially similar to those described above in FIG. 3. In addition, as shown in FIG. 4, the transceiver 410 may include a narrowband transceiver 416 and a wideband transceiver 418 to support dynamic bandwidth switching between narrowband channels and wideband channels. In some examples, control information may be transmitted on a narrowband channel, while control and data information may be transmitted on a wideband (wider bandwidth) channel. The narrowband transceiver 416 and wideband transceiver 418 may each include different transceiver hardware, or may be implemented via different operating modes involving a number of the same transceiver hardware blocks shared among the modes. For example, the narrowband transceiver mode and wideband transceiver mode may each support different levels of power consumption, with the narrowband transceiver mode achieving significant power savings compared to the wideband transceiver mode.

In some aspects of the disclosure, the processor 404 may include uplink (UL) data and control channel generation and transmission circuitry 442, configured to generate and transmit uplink data on an UL data channel, and to generate and transmit uplink control/feedback/acknowledgement information on an UL control channel. The UL data and control channel generation and transmission circuitry 442 may operate in coordination with UL data and control channel generation and transmission software 452. The processor 404 may further include downlink (DL) data and control channel reception and processing circuitry 444, configured for receiving and processing downlink data on a data channel, and to receive and process control information on one or more downlink control channels. In some examples, received downlink data and/or control information may be temporarily stored in a data buffer 415 within memory 405. The DL data and control channel generation and transmission circuitry 444 may operate in coordination with DL data and control channel generation and transmission software 454.

The processor 404 may further include subframe structure determination circuitry 446, configured for determining a subframe structure designated by the scheduling entity for one or more subframes. For example, the scheduling entity may transmit a number of resources designated for UL control and data and a number of resources designated for DL control and data for one or more subframes to the subordinate entity. The number of UL/DL resources may be received by the DL data and control channel reception and processing circuitry 444 and communicated to the subframe structure determination circuitry 446. The subframe structure determination circuitry 446 may further provide the number of UL/DL resources to the UL data and control channel generation and transmission circuitry 442 to enable generation and transmission of uplink control and data information in the one or more subframes in accordance with the designated number of UL resources.

The number of UL/DL resources may be communicated by the scheduling entity statically, dynamically or semi-dynamically. In an aspect of the disclosure, the number of resources (or other ratio information related to the desired/selected UL/DL ratio) may be transmitted within a message sent from the scheduling entity to the subordinate entities. The message may be, for example, a Radio Resource Control (RRC) message or other L2 or L3 message. In another aspect of the disclosure, the ratio information may be transmitted within a downlink control portion of a subframe sent prior to the one or more subframes to which the ratio information applies. The subframe structure determination circuitry 446 may operate in coordination with the subframe structure determination software 456.

Figure 5:
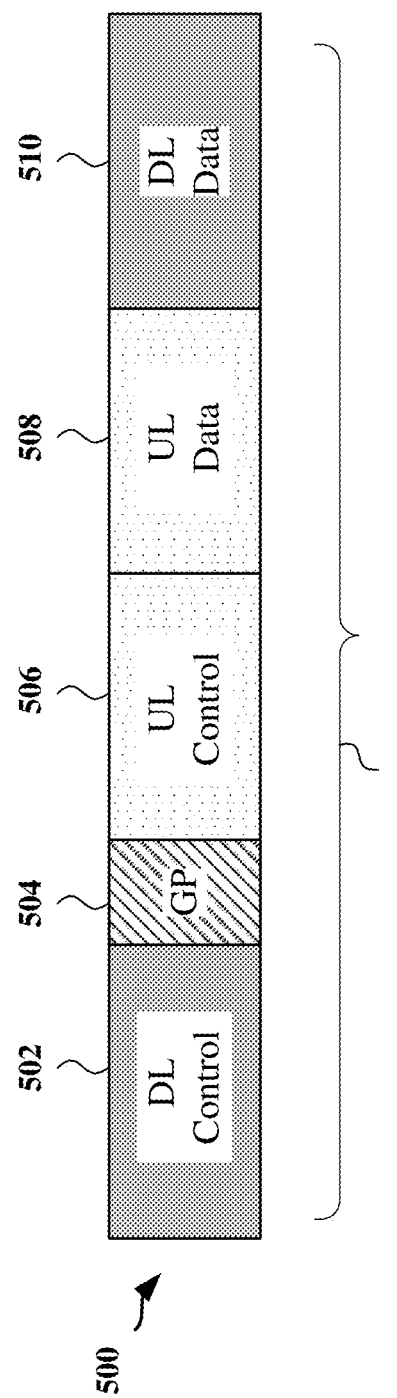
FIG. 5 is a diagram illustrating a configurable TDD subframe structure that may be used in some wireless communication networks.

FIG. 5 illustrates an exemplary configurable unified UL/DL TDD subframe structure 500. The configurable TDD subframe structure 500 provides a framework for creating a subframe 501 having a desired ratio of UL information to DL information. As shown in FIG. 5, the configurable TDD subframe structure 500 includes multiple portions 502-510 that are each separately configurable to achieve the desired UL/DL ratio.

As described above, in the context of a multiple access network, channel resources may be scheduled, and each entity may be synchronous. That is, each node utilizing the network may coordinate its usage of the resources such that transmissions are only made during the allocated portion of the frame, and the time of each allocated portion may be synchronized among the different nodes. One node acts as a scheduling entity. The scheduling entity may be a base station or access point, or a UE in a device-to-device (D2D) and/or mesh network. The scheduling entity manages the resources on the carrier and assigns resources to other users of the channel, including subordinate or scheduled entities, such as one or more UEs in a cellular network.

To enable scheduling of both uplink and downlink transmissions during a single subframe 501, the configurable TDD subframe structure 500 includes configurable transmit (Tx) portions 502 and 510 and configurable receive (Rx) portions 506 and 508. The configurable Tx portions include a DL control portion 502 for transmitting control information from the scheduling entity to one or more subordinate entities and a DL data portion 510 for transmitting data information from the scheduling entity to one or more subordinate entities. The configurable Rx portions include an UL control portion 506 for transmitting control information (i.e., acknowledgement information) from the one or more subordinate entities to the scheduling entity and an UL data portion 508 for transmitting data information from the one or more subordinate entities to the scheduling entity.

A guard period (GP) 504 is further included between the DL control portion 502 and the UL control portion 506 to enable sufficient time to switch between DL transmissions and UL transmissions. The GP 504 may be an integer number of symbols (e.g., 16 symbols), but the time duration could effectively be split between the DL-UL transition and the UL-DL transition by setting the timing advance parameter appropriately. Moreover, the GP 504 may be scaled based on cell size and processing requirements. For example, latencies due to RF antenna direction switching (e.g., from DL to UL) and transmission path latencies may cause the subordinate entity to transmit early on the UL to match DL timing. Such early transmission may interfere with symbols received from the scheduling entity. Accordingly, the GP portion 504 may allow an amount of time after the DL control portion 502 to prevent interference, where the GP portion 504 may provide an appropriate amount of time for the scheduling entity to switch its RF antenna direction and for the over-the-air (OTA) transmission time. In addition, the GP portion 504 may also provide an appropriate amount of time for the subordinate entity to switch its RF antenna direction (e.g., from DL to UL) and for the over-the-air (OTA) transmission time.

The size of each of the DL control portion 502, UL control portion 506, UL data portion 508 and DL data portion 510 is determined based on the desired UL/DL ratio. In various aspects of the disclosure, one or more of the UL control portion 506, UL data portion 508 and DL data portion 510 may be collapsed into other portions. However, each subframe 501 may include at least the DL control portion 502, GP portion 504 and a data portion (UL and/or DL). In addition, the sizes of the DL control portion 502 and UL control portion 506 may be asymmetric (e.g., the DL control portion 502 may include more symbols than the UL control portion 506), as the DL control portion 502 carries scheduling information (i.e., DL assignment and/or UL grant).

In an aspect of the disclosure, when the UL/DL ratio is minimized such that the minimum number of symbols is allocated to uplink transmissions, the resulting subframe may be referred to herein as a downlink-centric (DL-centric) TTI or DL-centric subframe. A DL-centric subframe may be used to carry downlink control and data information to one or more subordinate entities, which may be UEs for example, and also to receive acknowledgement information (e.g., ACK/NACK signals) from the subordinate entity or entities. To achieve a DL-centric subframe, the UL data portion 508 may be completely collapsed into the DL data portion 510 such that the DL data portion 510 occupies the entire data portion (e.g., the UL data portion 508 is omitted and the DL data portion 510 includes the symbols allocated to both the DL data portion 510 and the UL data portion 508). In addition, the DL acknowledgement information (e.g., acknowledged (ACK)/not acknowledged (NACK) signals sent from the one or more subordinate entities to the scheduling entity) may be carried in the UL control portion 506.

Thus, in such a DL-centric subframe, the scheduling entity first has an opportunity to transmit control information in the control portion 502. Following the guard period (GP) portion 504, the scheduling entity has an opportunity to receive acknowledged (ACK)/not acknowledged (NACK) signals in the UL control portion 506 from subordinate entities using the carrier. The scheduling entity then has an opportunity to transmit data in both the UL data and DL data portions 508 and 510. This subframe structure is considered downlink-centric, as more resources are allocated for transmissions in the downlink direction (e.g., transmissions from the scheduling entity) than for transmissions in the uplink direction (e.g., transmissions from the subordinate entities).

In one example of DL-centric subframes, the DL control portion 502 may be used to transmit a physical downlink control channel (PDCCH), indicating time-frequency assignments of data packets intended for one or more subordinate entities in the subframe 501, along with any other required channels, such as a physical downlink shared channel (PDSCH) and any pilots, such as a channel state information—reference signal (CSI-RS). In addition, the UL/DL data portions 508/510 may be used to transmit a DL data payload including the data packets intended for the one or more subordinate entities within the assigned time-frequency slots of the subframe 501. Thus, each subordinate entity that will be receiving data in the data portions 508/510 of the subframe 501 may be individually addressed in the control portion 502 of the subframe 501, so that the subordinate entities can receive and process the correct downlink data packets. In the next or other subsequent subframe, the scheduling entity may receive an ACK signal (or a NACK signal) during the UL control portion 506 from each subordinate entity that received data packets during the data portions 508/510 of the subframe 501 to indicate whether the DL data payload was successfully received.

Thus, the configurable subframe structure 500 supports an interlaced mode of operation on the downlink in which DL data is included in a current subframe 501 and DL acknowledgement information (ACK/NACK) is included in a different subframe transmitted subsequent to the current subframe. The subsequent subframe may be an immediately subsequent subframe to support two interlaces or any later subframe to support a desired number of interlaces.

In an aspect of the disclosure, the UL control portion 506 may also be used for transmission of other uplink control channels and information, such as the physical uplink control channel (PUCCH), random access channel (RACH), scheduling request (SR), sounding reference signal (SRS), channel quality indicator (CQI), channel state feedback information and buffer status. In addition, the data portions 508/510 may be used to multiplex DL data transmissions to a set of subordinate entities (i.e., two or more subordinate entities) within the subframe 501. For example, the scheduling entity may multiplex downlink data to the set of subordinate entities using time division multiplexing (TDM), frequency division multiplexing (FDM) (i.e., OFDM), code division multiplexing (CDM), and/or any suitable multiplexing scheme known to those of ordinary skill in the art. Thus, the data portions 508/510 may include data for multiple users and up to a high order of multi-user MIMO. In addition, the DL control portion 502 and UL control portion 506 may also be used to multiplex control information to or from a set of subordinate entities in a TDM, FDM, CDM, and/or other suitable manner.

In another aspect of the disclosure, when the UL/DL ratio is maximized such that the maximum number of symbols is allocated to uplink transmissions, the resulting subframe may be referred to herein as an uplink-centric (UL-centric) TTI or UL-centric subframe. An UL-centric subframe may be used to receive downlink control information from the scheduling entity, transmit uplink data to a scheduling entity, and receive a downlink ACK/NACK signal for the transmitted data from the scheduling entity. To achieve an UL-centric subframe, the DL data portion 510 may be completely collapsed into the UL data portion 508 such that the UL data portion 508 occupies the entire data portion (e.g., the DL data portion 510 is omitted and the UL data portion 508 includes the symbols allocated to both the DL data portion 510 and the UL data portion 508). In some aspects of the disclosure, the UL control portion 506 may further be completely collapsed into the UL data portion 508. In addition, the UL acknowledgement information (e.g., acknowledged (ACK)/not acknowledged (NACK) signals sent from the scheduling entity to one or more subordinate entities) may be carried in the DL control portion 502.

Thus, in such an UL-centric subframe, the scheduling entity first has an opportunity to transmit control information, such as PDCCH and UL ACK/NACK, in the DL control portion 502. Following the GP portion 504, the subordinate entity has an opportunity to transmit UL data in the UL control, UL data and DL data portions 506, 508 and 510. The UL data may include multiple users and up to a high order of multi-user MIMO. This subframe structure is uplink-centric, as more resources are allocated for transmissions in the uplink direction (e.g., transmissions from the subordinate entity) than in the downlink direction (e.g., transmissions from the scheduling entity).

In one example of UL-centric subframes, the DL control portion 502 may be used to transmit a physical downlink control channel (PDCCH) indicating time-frequency assignments of data packets to be transmitted by one or more subordinate entities in the subframe 501. In addition, the UL control, UL data and DL data portions 506, 508 and 510 may be used to transmit an UL data payload including data packets transmitted by the subordinate entities to the scheduling entity within their assigned time-frequency slots in the subframe 501. In the next or subsequent subframe, each subordinate entity that transmitted UL data within subframe 501 may receive an ACK signal (or a NACK signal) from the scheduling entity during the DL control portion 502 to indicate whether the UL data payload was successfully received.

Thus, the configurable subframe structure 500 further supports an interlaced mode of operation on the uplink in which UL data is included in a current subframe 501 and UL acknowledgement information (ACK/NACK) is included in a different subframe transmitted subsequent to the current subframe. The subsequent subframe may be an immediately next subframe to support two interlaces or any later subframe to support a desired number of interlaces.

In other examples, the DL control portion 502 may be used to transmit other downlink control channels and information and/or data from other layers. In addition, the data portions 506/508/510 may also be used to transmit uplink control channels and information. For example, the DL control portion 502 of the subframe 501 may carry a data transmission (e.g., a small payload of data) for a subordinate entity, such as an application layer (or layer other than the physical layer) ACK from a previous subframe. The subordinate entity may then acknowledge the data transmission in the data portions 506/508/510 of the same subframe 501 and/or subsequent subframe(s).

In an aspect of the disclosure, the data portions 506/508/510 may be used to carry data transmissions from a set of subordinate entities (i.e., two or more subordinate entities) within the subframe 501 using one or more of TDMA, FDMA, CDMA, or any other suitable multiple access scheme. Thus, the data portions 506/508/510 may include packets from multiple users and up to a high order of multi-user MIMO. In addition, the DL control portion 502 may also be used to carry control information to a set of subordinate entities in a TDMA, FDMA, CDMA, or other suitable multiple access manner.

Figure 6:
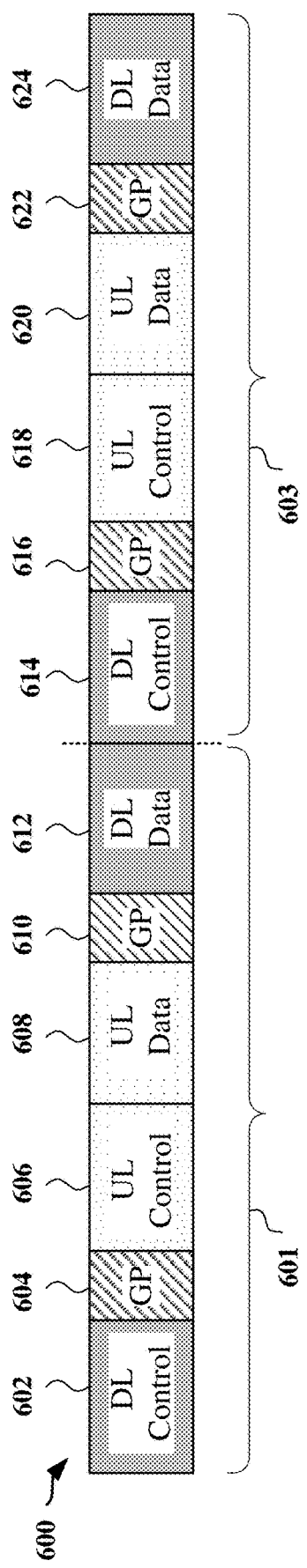
FIG. 6 is a diagram illustrating a configurable TDD subframe structure that may be used in some wireless communication networks.

FIG. 6 is a diagram illustrating a configurable TDD subframe structure 600 for use in configuring one or more subframes 601 and 603. In the subframe structure 600 of FIG. 6, two guard periods (GPs) 604 and 610 are provided for both transitions between UL/DL transmissions. In some examples, the GP duration for both transitions 604 and 610 may add up to an integer multiple of symbols.

In addition, the subframe structure 600 supports a two-interlaced operation. In the two-interlaced operation, subframe 601 corresponds to the N subframe, subframe 603 corresponds to the N+1 subframe and the subframe immediately prior to subframe 601 corresponds to the N−1 subframe (not shown). Traffic and signaling associated with the N−1 and N+1 subframes belong to one interlace and traffic and signaling associated with the N subframe belongs to the other interlace. However, a higher number of interlaces may be supported if a more relaxed processing timeline is desired.

For example, in subframe 601, DL control information, such as the PDCCH for the current subframe N and the UL ACK/NACK corresponding to UL data transmitted the previous subframe N−1, may be transmitted by the scheduling entity in a DL control portion 602. Following the first GP portion 604, UL control information, such as the DL ACK/NACK corresponding to DL data transmitted in the previous subframe N−1, may be transmitted by the subordinate entities in the UL control portion 606 of the subframe 601. The subordinate entities may then transmit UL data information for the current subframe N in the UL data portion 608 and following a second GP portion 610, the scheduling entity may transmit DL data information for the current subframe N in the DL data portion 612.

Based on the DL ACK/NACK information received in the UL control portion 606 of subframe 601, the scheduling entity generates control information for a control portion 614 of a next (second) subframe 603. For example, if the ACK/NACK information includes a NACK signal, at least part of the coded bits of the data information transmitted in the DL data portion of the N−1 subframe (not shown) may be retransmitted in a DL data portion 624 of the subframe 603. Moreover, if the UL ACK/NACK information received in the DL control portion 602 of subframe 601 includes a NACK signal, the subordinate entity retransmits at least a part of the coded bits of the data information transmitted in the UL data portion of the N−1 subframe in the UL data portion 620 of subframe 603.

Thus, in subframe 603, DL control information, such as the PDCCH for the current subframe N+1 and the UL ACK/NACK corresponding to UL data transmitted the previous subframe N, may be transmitted by the scheduling entity in a DL control portion 614. Following the first GP portion 616, UL control information, such as the DL ACK/NACK corresponding to DL data transmitted in the previous subframe N, may be transmitted by the subordinate entities in the UL control portion 618 of the subframe 603. The subordinate entities may then transmit UL data information for the current subframe N+1 (and retransmissions of any data incorrectly received in the N−1 subframe) in the UL data portion 620 and following a second GP portion 622, the scheduling entity may transmit DL data information for the current subframe N+1 (and retransmissions of any data incorrectly received in the N−1 subframe) in the DL data portion 624.

As in FIG. 5, the size of each of the DL control portion 602, UL control portion 606, UL data portion 608 and DL data portion 612 is configurable and determined based on the desired UL/DL ratio. In various aspects of the disclosure, one or more of the UL control portion 606, UL data portion 608, DL data portion 612 and second GP 610 may be collapsed into other portions. However, each subframe 601 and 603 may include at least the DL control portion 602, GP portion 604 and a data portion (UL and/or DL).

In one example of DL-centric subframes, the UL/DL data portions 608/612 and second GP portion 610 of subframe 601 may be used to transmit a DL data payload. In the next subframe 603, the scheduling entity may receive an ACK signal (or a NACK signal) from the subordinate entity during the UL control portion 618 to indicate whether the DL data payload was successfully received. Thus, the DL control portion 614 and first GP portion 616 of the second subframe 603 are interleaved between the DL data (portions 608, 610 and 612) and the DL ACK/NACK portion 618. This interleaved data/ACK structure provides a relaxed processing timeline for DL-centric subframe generation and transmission.

In one example of UL-centric subframes, the UL control, UL data and DL data portions 606, 608 and 612 and second GP 610 of subframe 601 may be used to transmit an UL data payload. In the next subframe 603, the subordinate entity may receive an ACK signal (or a NACK signal) from the scheduling entity during the DL control portion 614 to indicate whether the UL data payload was successfully received. If the PDCCH is placed in the DL control portion 614 before other DL control information (e.g., UL ACK), the PDCCH is interleaved between the UL data and the UL ACK, which may provide sufficient processing time for the scheduling entity to turn-around the UL ACK.

Figure 7:
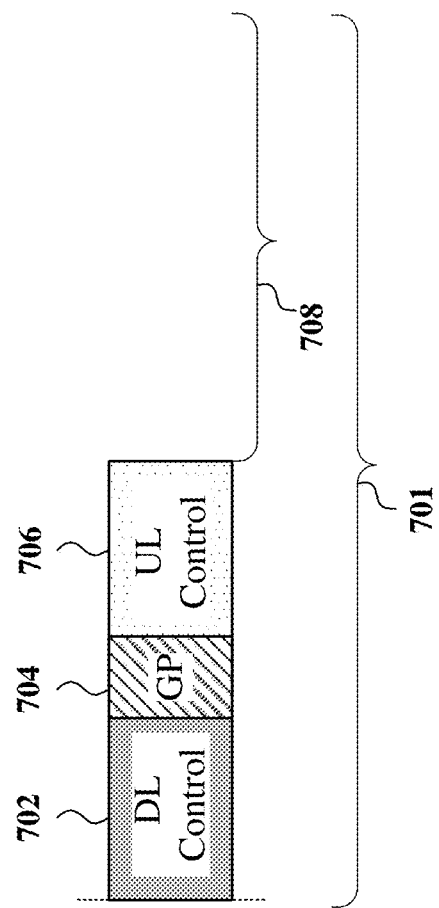
FIG. 7 is a diagram illustrating a configurable TDD subframe structure supporting micro-sleep.

FIG. 7 is a diagram illustrating the configurable TDD subframe structure of FIG. 5 or 6 supporting efficient micro-sleep. Significant power savings can be achieved by enabling a UE to enter a micro-sleep mode. During micro-sleep, a UE powers down one or more receiver circuits (e.g., transceiver 410 and/or one or more processor circuits 442-446 shown in FIG. 4) for a portion of a subframe. In some examples, a UE may power on all of its receiver circuits for a first portion of the subframe (e.g., typically the portion containing the control information), and once the UE determines that the subframe does not include any data destined for the UE, the UE may power down one or more receiver circuits for the remainder of the subframe.

As shown in FIG. 7, since the UL/DL control information is concentrated in the start of the subframe 701 (e.g., portions 702-706), once UL/DL data transmissions for a particular subordinate entity (UE) terminate, that UE is able to enter into a micro-sleep mode 708 for the remainder of the subframe 701 after the UL/DL control information has been sent/received.

Figure 8:
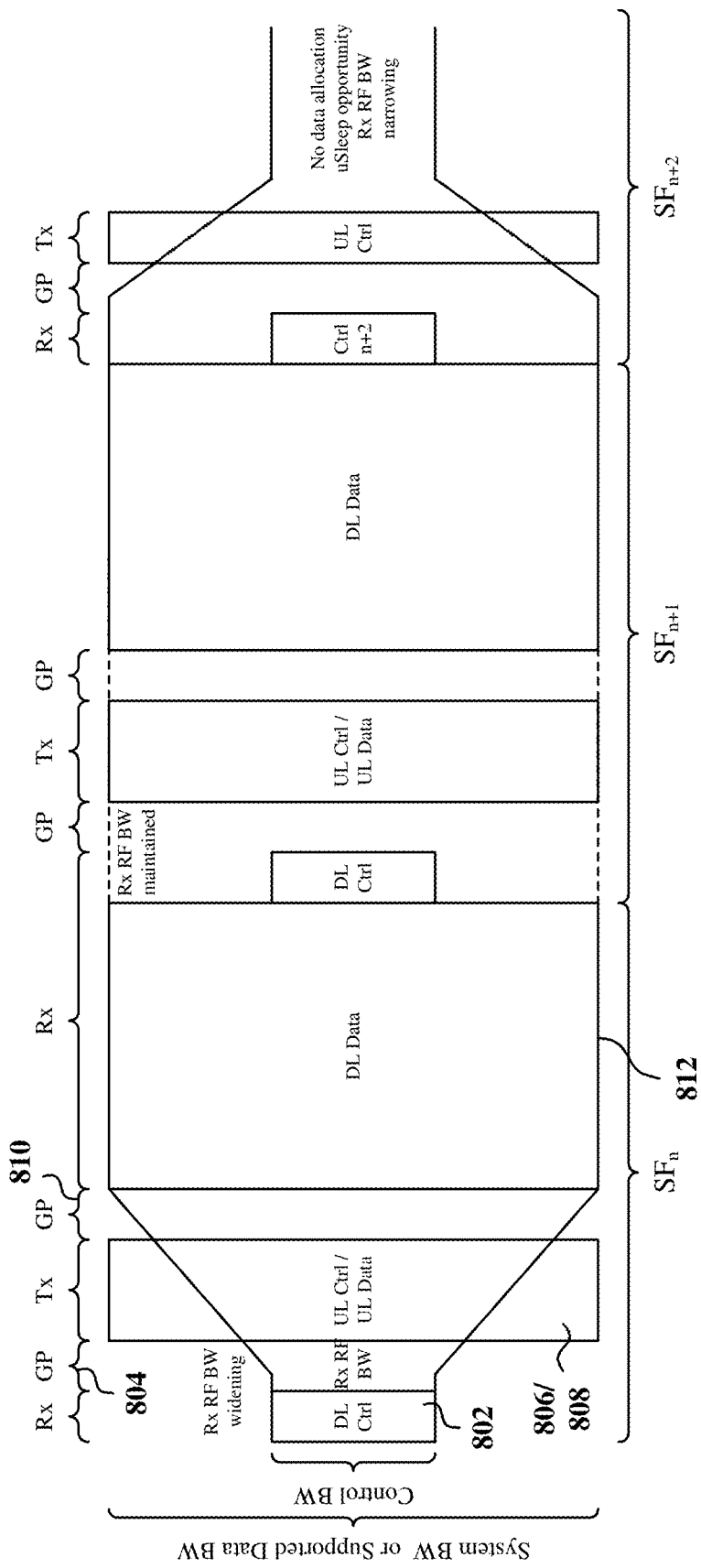
FIG. 8 is a diagram illustrating a configurable TDD subframe structure supporting dynamic bandwidth switching.

FIG. 8 is a diagram illustrating the configurable TDD subframe structure of FIG. 6 supporting dynamic bandwidth switching with micro-sleep. In an aspect of the disclosure, control information may be transmitted on a narrowband channel, while both control and data information may be transmitted on a wider bandwidth (wideband) channel. To facilitate power savings while ensuring receipt of control information, a UE may include both a narrowband receiver and one or more wider bandwidth receivers (as shown in FIG. 4), and may power on the narrowband receiver, while powering down the wideband receiver during micro-sleep. As described above, the narrowband and wideband receivers may each include different receiver hardware, or may be implemented via different operating modes involving a number of the same receiver hardware blocks. When using a narrower bandwidth receiver or a narrow bandwidth receiver mode, the sampling frequency of the analog-to-digital converter (ADC) in the receiver can be decreased significantly. Since the power consumption of the ADC is directly proportional to the sampling frequency and to the number of bits, power savings can be achieved using the narrowband receiver as compared to the wideband receiver. The UE may further support dynamic bandwidth switching between the narrowband receiver and the wideband receiver (or narrow bandwidth receiver mode and wide bandwidth receiver mode) based on the control information contained in a current subframe.

As shown in FIG. 8, by interleaving UL control/data 806/808 and GPs 804 and 810 between DL control 802 and DL data 812, dynamic bandwidth switching may be supported with less overhead. For example, the DL control information 802 (including PDCCH and UL ACK) for a current subframe $SF_N$ may be received by the UE using a narrowband RF receiver (or narrowband RF receiver mode). If the DL control information indicates that there is a DL assignment for the UE, the UE has sufficient time during the UL control/UL data portions 804-810 to transition to a wider bandwidth RF receiver. The DL data 812 may then be received using the wider bandwidth receiver. The wider bandwidth receiver may also remain wide for the next subframe $SF_{N+1}$ and any other subsequent subframes until the UE receives a subframe (e.g., subframe $SF_{N+2}$) for which a DL assignment is not found.

Figure 9:
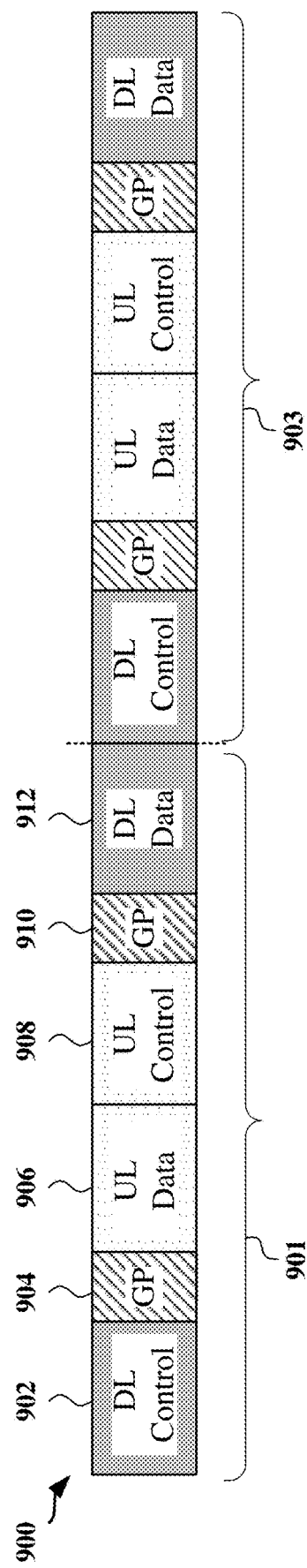
FIG. 9 is a diagram illustrating a configurable TDD subframe structure that may be used in some wireless communication networks.

FIG. 9 is a diagram illustrating a configurable TDD subframe structure 900 for use in configuring one or more subframes 901 and 903. In the subframe structure 900 of FIG. 9, the UL data/control portions 906/908 have been swapped in order to provide the scheduling entity with more UL data processing time. For example, the scheduling entity may process the UL data during not only the GP 910 and DL data portion 912, but also the UL control portion 908 of the subframe. However, this structure provides the scheduling entity with less DL ACK processing time (since the DL ACK is included in the UL control portion 908) and less time to schedule and generate DL data retransmissions in DL data portion 912 based on the DL ACKs in the UL control portion 908. Furthermore, this structure is less optimal for micro-sleep since the DL and UL control portions 902 and 908 are not concentrated at the beginning of the subframe 901.

Similar to the subframe structure shown in FIG. 6, the subframe structure 900 shown in FIG. 9 also supports a two-interlaced operation in which traffic and signaling associated with the N−1 and N+1 subframes belong to one interlace and traffic and signaling associated with the N subframe belongs to the other interlace. However, a higher number of interlaces may be supported if a more relaxed processing timeline is desired.

In addition, as in FIGS. 5 and 6, the size of each of the DL control portion 902, UL data portion 906, UL control portion 908 and DL data portion 912 is configurable and determined based on the desired UL/DL ratio. In various aspects of the disclosure, one or more of the UL data portion 906, UL control portion 908, DL data portion 912 and second GP 910 may be collapsed into other portions. However, each subframe 901 and 903 may include at least the DL control portion 902, GP portion 904 and a data portion (UL and/or DL).

Figure 10:
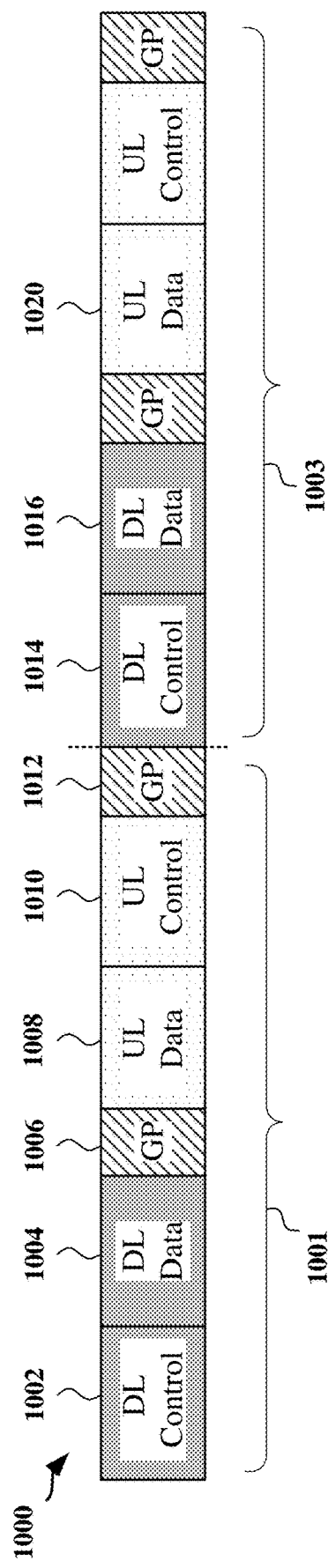
FIG. 10 is a diagram illustrating a configurable TDD subframe structure that may be used in some wireless communication networks.

FIG. 10 is a diagram illustrating a configurable TDD subframe structure 1000 for use in configuring one or more subframes 1001 and 1003. In the subframe structure 1000 of FIG. 10, the DL transmissions are grouped together and the UL transmissions are grouped together. Thus, the DL data portion 1004 follows the DL control portion 1002 (including PDCCH and UL ACK). Following a first guard period (GP) 1006 is the UL data portion 1008 and the UL control portion 1010 (e.g., DL ACK). A second guard period 1012 is optionally included between the UL control portion 1010 of the first subframe 1001 and the DL control portion 1014 of the second (next) subframe 1003.

With the subframe structure 1000 shown in FIG. 10, both an interlaced (two or more interlaces) mode of operation and a non-interlaced (single-interlaced) mode of operation may be supported. In the interlaced mode of operation, such as the two-interlaced mode of operation shown in FIG. 10, traffic and signaling associated with the N−1 and N+1 subframes belong to one interlace and traffic and signaling associated with the N and N+2 subframes belongs to the other interlace. For example, DL data retransmission for a NACK carried on the DL ACK portion 1010 of subframe 1001 (subframe N) will occur in subframe N+2 (not shown). Likewise, UL data retransmission for a NACK carried on the UL ACK 1014 for subframe N will occur in subframe N+2.

In the non-interlaced mode of operation, DL data retransmission for a NACK carried on the DL ACK portion 1010 of subframe 1001 (subframe N) will occur in the DL data portion 1016 of subframe 1003 (subframe N+1). Likewise, UL data retransmission for a NACK carried on the UL ACK 1014 for subframe N will occur in the UL data portion 1020 of subframe N+1 (subframe 1003).

In addition, as in previously described subframe structures, the size of each of the DL control portion 1002, DL data portion 1004, UL data portion 1008 and UL control portion 1010 is configurable and determined based on the desired UL/DL ratio. In various aspects of the disclosure, one or more of the DL data portion 1004, UL data portion 1008, UL control portion 1010 and one or both of the GP 1006 and 1012 may be collapsed into other portions. However, each subframe 1001 and 1003 may include at least the DL control portion 1002 and a data portion (UL and/or DL).

Figure 11:
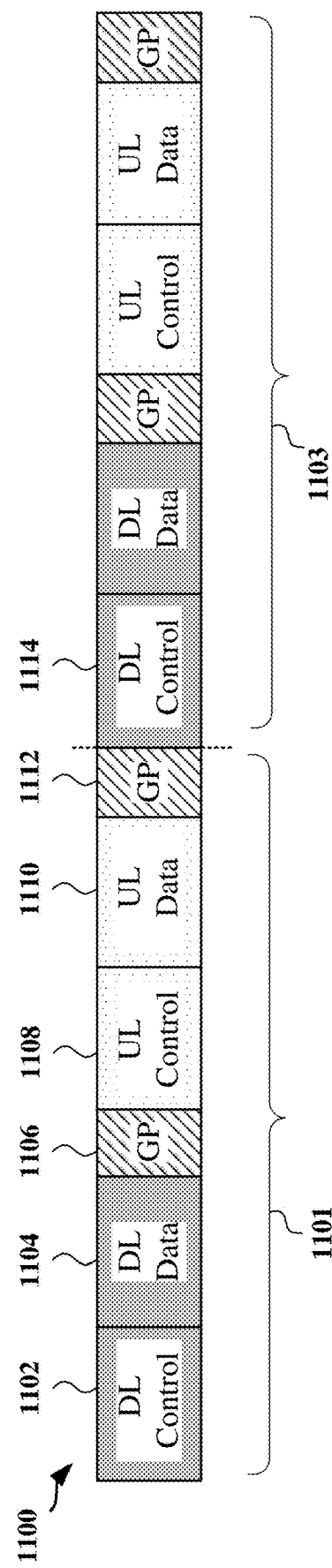
FIG. 11 is a diagram illustrating a configurable TDD subframe structure that may be used in some wireless communication networks.

FIG. 11 is a diagram illustrating a configurable TDD subframe structure 1100 for use in configuring one or more subframes 1101 and 1103. In the subframe structure 1100 of FIG. 11, the UL control/data portions 1108/1110 are swapped with respect to the structure shown in FIG. 10. Thus, the DL data portion 1104 follows the DL control portion 1102 (including PDCCH and UL ACK). Following a first guard period (GP) 1106 is the UL control portion 1108 (e.g., DL ACK) and the UL data portion 1110. A second guard period 1112 is optionally included between the UL data portion 1110 of the first subframe 1101 and the DL control portion 1114 of the second (next) subframe 1103.

The structure 1100 shown in FIG. 11 also supports both an interlaced and a non-interlaced mode of operation. This structure provides the scheduling entity with additional processing time to schedule and generate DL data retransmission at the expense of less DL data processing time at the subordinate entity.

In addition, as in previously described subframe structures, the size of each of the DL control portion 1102, DL data portion 1104, UL control portion 1108 and UL data portion 1110 is configurable and determined based on the desired UL/DL ratio. In various aspects of the disclosure, one or more of the DL data portion 1104, UL control portion 1108, UL data portion 1110 and one or both of the GP 1106 and 1112 may be collapsed into other portions. However, each subframe 1101 and 1103 may include at least the DL control portion 1102 and a data portion (UL and/or DL).

Figure 12:
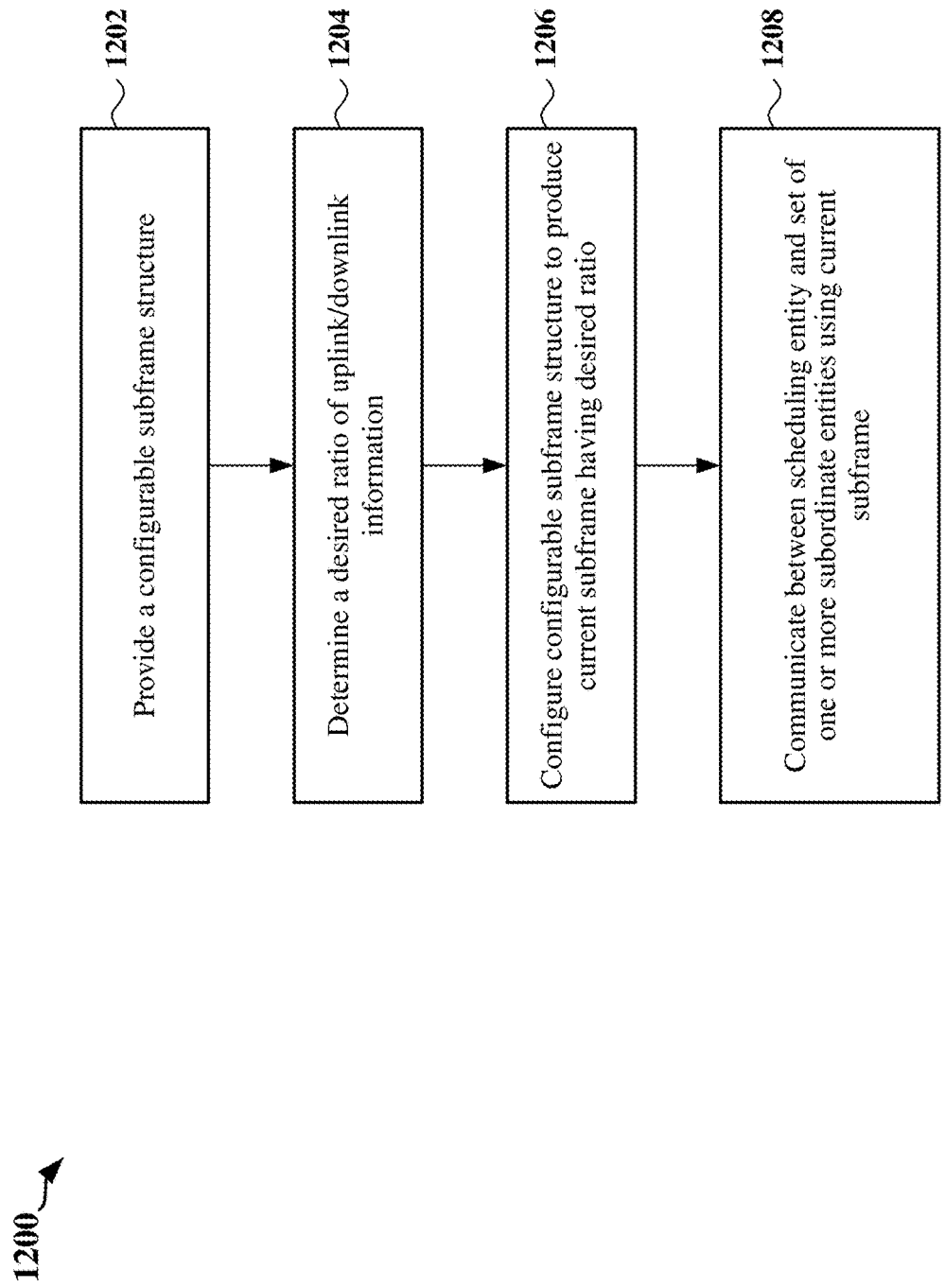
FIG. 12 is a flow chart of a method of wireless communication utilizing a configurable TDD subframe structure.

FIG. 12 is a flow chart 1200 of a method of wireless communication utilizing a configurable TDD subframe structure. The method may be performed by a scheduling entity. At block 1202, the scheduling entity provides a configurable bi-directional TDD subframe structure for use in configuring one or more subframes. For example, with reference to FIGS. 5 6, 9, 10 and 11, the scheduling entity may provide a configurable subframe structure including a downlink control portion, an uplink control portion, an uplink data portion and a downlink data portion in which the size of one or more of portions may be configurable.

At block 1204, the scheduling entity determines a desired ratio of uplink (UL) information to downlink (DL) information for one or more subframes. A single UL/DL ratio may be used for both the control and data information or separate UL/DL ratios may be used for the control information and the data information. The UL/DL ratio may be expressed, for example, as a number of symbols allocated to UL control, UL data, DL control and DL data. The number of symbols allocated to UL control and DL control may be asymmetric since the scheduling entity schedules both UL and DL transmissions.

In various aspects of the disclosure, the UL/DL ratio may be determined upon initialization of the scheduling entity or periodically based on, for example, the amount and/or type of data to be transmitted in the access network. Other factors may also be considered in determining the UL/DL ratio, including, but not limited to, the throughput, buffer (e.g., hybrid automatic repeat request (HARQ) buffer size), and/or latency requirements of the subordinate entity, the power consumption and/or processing speed of the scheduling entity and/or the subordinate entity and the link budget of the uplink/downlink The UL/DL ratio may further be communicated to a set of one or more subordinate entities. In various aspects of the disclosure, the number of UL/DL symbols may be communicated by the scheduling entity statically, dynamically or semi-dynamically. In an aspect of the disclosure, the number of symbols (or other ratio information related to the desired/selected UL/DL ratio) may be transmitted within a message sent from the scheduling entity to the subordinate entities. The message may be, for example, a Radio Resource Control (RRC) message or other L2 or L3 message. In another aspect of the disclosure, the ratio information may be transmitted within a downlink control portion of a subframe sent prior to the one or more subframes to which the ratio information applies.

At block 1206, the scheduling entity configures the configurable subframe structure to produce a current subframe having the desired UL/DL ratio of both control and data information. In various aspects of the disclosure, the size of each of the DL control portion, UL control portion, UL data portion and DL data portion is configurable and determined based on the desired UL/DL ratio. For example, one or more of the UL control portion, UL data portion and DL data portion may be collapsed into other portions to form an UL-centric subframe or DL-centric subframe. However, the current subframe may include at least the DL control portion and a data portion (UL and/or DL).

At block 1208, communications between the scheduling entity and the set of one or more subordinate entities occur using the current subframe. In an aspect of the disclosure, UL and DL transmissions are interleaved within the current subframe and between the current subframe and a next subframe to allow for streamlined processing of data and acknowledgement information. In addition, the configurable TDD subframe structure may support an interlaced or non-interlaced mode of operation for the current subframe and one or more subsequent subframes. Furthermore, the configurable TDD subframe structure utilized may support efficient micro-sleep and/or dynamic bandwidth switching by one or more subordinate entities during the current subframe.

Figure 13:
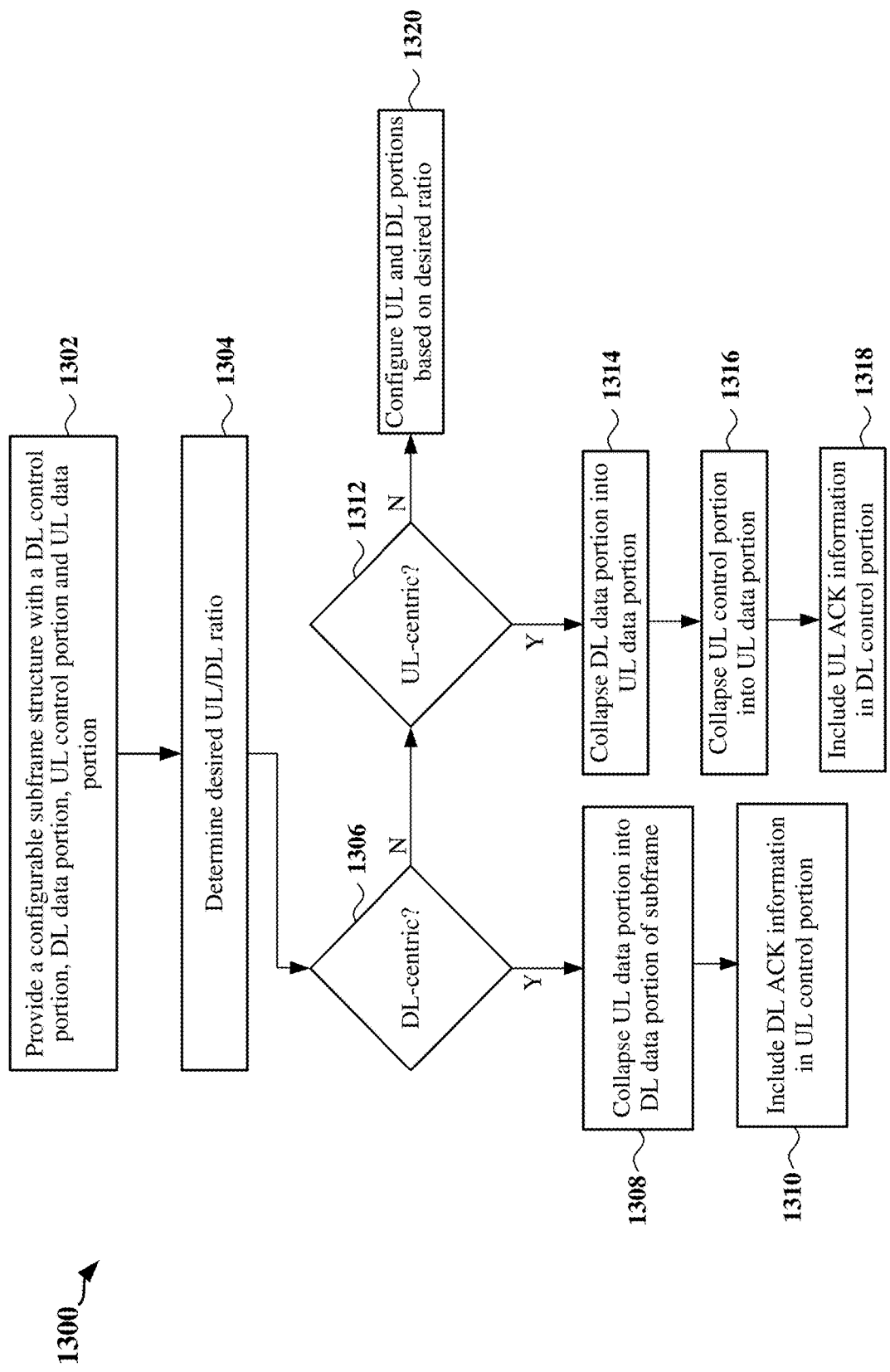
FIG. 13 is a flow chart of a method of configuring a subframe utilizing a configurable TDD subframe structure.

FIG. 13 is a flow chart 1300 of a method of configuring a subframe utilizing a configurable TDD subframe structure. The method may be performed by a scheduling entity. At block 1302, the scheduling entity provides a configurable bi-directional TDD subframe structure for use in configuring one or more subframes. For example, with reference to FIGS. 5 6, 9, 10 and 11, the scheduling entity may provide a configurable subframe structure including a downlink control portion, an uplink control portion, an uplink data portion and a downlink data portion in which the size of one or more of portions may be configurable.

At block 1304, the scheduling entity determines a desired ratio of uplink (UL) information to downlink (DL) information for one or more subframes. A single UL/DL ratio may be used for both the control and data information or separate UL/DL ratios may be used for the control information and the data information. The UL/DL ratio may be expressed, for example, as a number of symbols allocated to UL control, UL data, DL control and DL data. The number of symbols allocated to UL control and DL control may be asymmetric since the scheduling entity schedules both UL and DL transmissions.

At block 1306, the scheduling entity determines whether the desired UL/DL ratio indicates that the DL-centric subframe structure should be used for the one or more subframes. A DL-centric subframe structure may be indicated, for example, when the UL/DL ratio is minimized such that the minimum number of symbols is allocated to uplink transmissions. If the UL/DL ratio indicates that the one or more subframes are DL-centric subframes, at block 1308, the scheduling entity collapses the UL data portion into the DL data portion such that the DL data portion occupies the entire data portion (e.g., the UL data portion is omitted and the DL data portion includes the symbols allocated to both the DL data portion and the UL data portion). In addition, at block 1310, the DL acknowledgement information (e.g., acknowledged (ACK)/not acknowledged (NACK) signals sent from the one or more subordinate entities to the scheduling entity) is included in the UL control portion of the subframes.

If the UL/DL ratio does not indicate that the DL-centric subframe structure should be used, at block 1312, the scheduling entity determines whether the UL/DL ratio indicates that the UL-centric subframe structure should be used for the one or more subframes. An UL-centric subframe structure may be indicated, for example, when the UL/DL ratio is maximized such that the maximum number of symbols is allocated to uplink transmissions. If the UL/DL ratio indicates that the one or more subframes are UL-centric subframes, at block 1314, the scheduling entity collapses the DL data portion into the UL data portion such that the UL data portion occupies the entire data portion (e.g., the DL data portion is omitted and the UL data portion includes the symbols allocated to both the DL data portion and the UL data portion. In addition, at block 1316, the scheduling entity collapses the UL control portion into the UL data portion. Furthermore, at block 1318, the UL acknowledgement information (e.g., acknowledged (ACK)/not acknowledged (NACK) signals sent from the scheduling entity to one or more subordinate entities) is included in the DL control portion.

Figure 14:
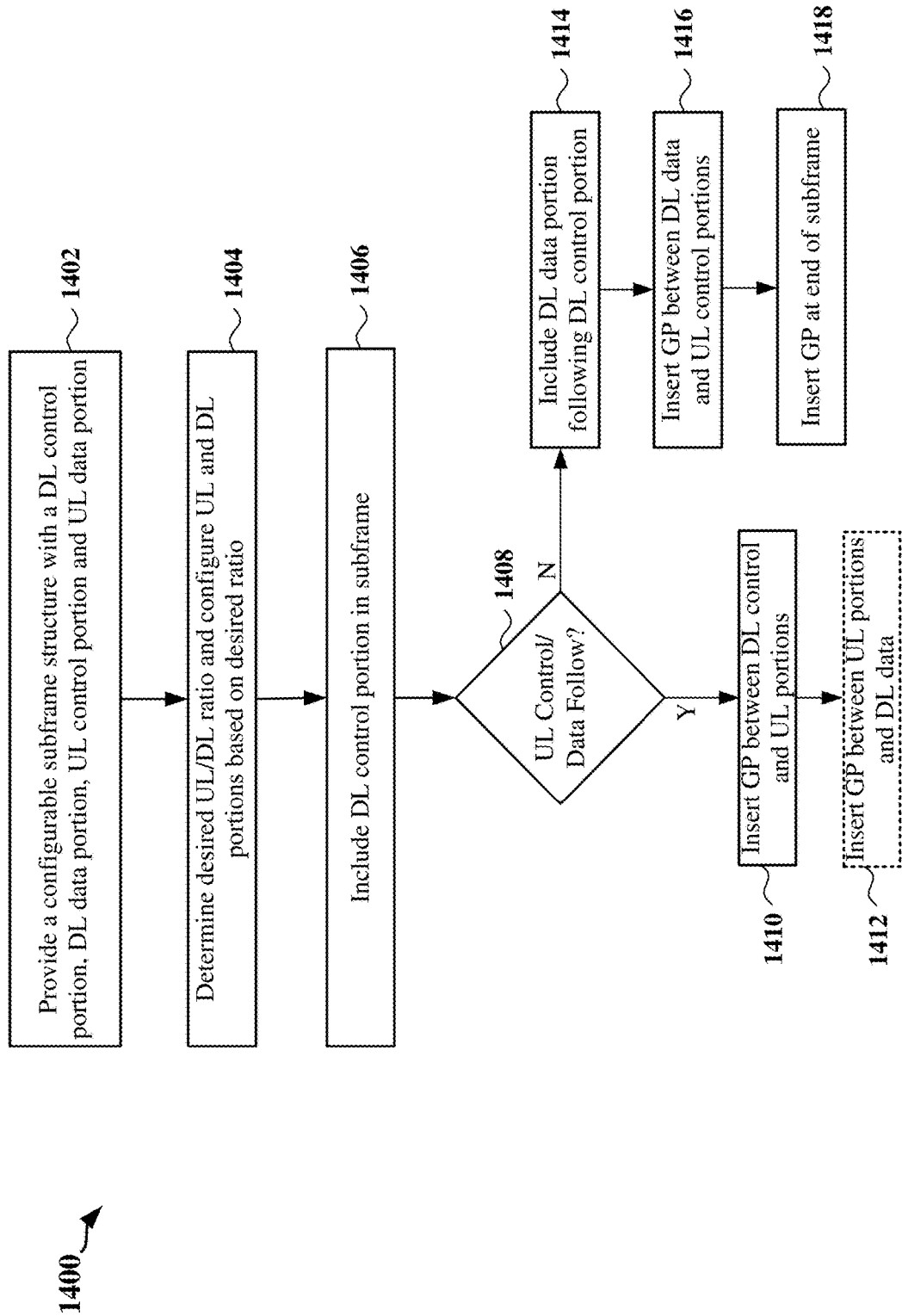
FIG. 14 is a flow chart of another method of configuring a subframe utilizing a configurable TDD subframe structure.

If the UL/DL ratio does not indicate that the DL-centric subframe structure or UL-centric subframe structure should be used, at block 1320, the scheduling entity configures the UL and DL portions based on the desired UL/DL ratio. As indicated above, the size of each of the DL control portion, UL control portion, UL data portion and DL data portion is determined based on the desired UL/DL ratio FIG. 14 is a flow chart 1400 of another method of configuring a subframe utilizing a configurable TDD subframe structure. The method may be performed by a scheduling entity. At block 1402, the scheduling entity provides a configurable bi-directional TDD subframe structure for use in configuring one or more subframes. For example, with reference to FIGS. 5 6, 9, 10 and 11, the scheduling entity may provide a configurable subframe structure including a downlink control portion, an uplink control portion, an uplink data portion and a downlink data portion in which the size of one or more of portions may be configurable.

At block 1404, the scheduling entity determines a desired ratio of uplink (UL) information to downlink (DL) information for one or more subframes and configures the size of each of the UL and DL portions of the subframes based on the desired UL/DL ratio. A single UL/DL ratio may be used for both the control and data information or separate UL/DL ratios may be used for the control information and the data information. The UL/DL ratio may be expressed, for example, as a number of symbols allocated to UL control, UL data, DL control and DL data. The number of symbols allocated to UL control and DL control may be asymmetric since the scheduling entity schedules both UL and DL transmissions.

At block 1406, the scheduling entity includes a DL control portion in each of the subframes. At block 1408, the scheduling entity determines whether to include an UL portion (control or data) following the DL control portion in each of the subframes. If an UL portion is to follow the DL control portion, at block 1410, the scheduling entity inserts a Guard Period (GP) between the DL control portion and the UL portion. In one example, the scheduling entity includes the UL control portion following the GP, the UL data portion following the UL control portion, and the DL data portion following the UL control portion. In other examples, the scheduling entity includes the UL data portion following the GP, the UL control portion following the UL data portion, and the DL data portion following the UL data portion. At block 1412, the scheduling entity may further optionally insert another GP between the end of the UL portions and the DL data portion.

If an UL portion does not follow the DL control portion, at block 1414, the scheduling entity includes the DL data portion following the DL control portion. At block 1416, the scheduling entity includes a GP between the DL data portion and the UL portions. In one example, the scheduling entity includes the UL control portion following the GP and the UL data portion following the UL control portion. In other examples, the scheduling entity includes the UL data portion following the GP and the UL control portion following the UL data portion. At block 1418, the scheduling entity includes another GP at the end of each of the subframes.

Figure 15:
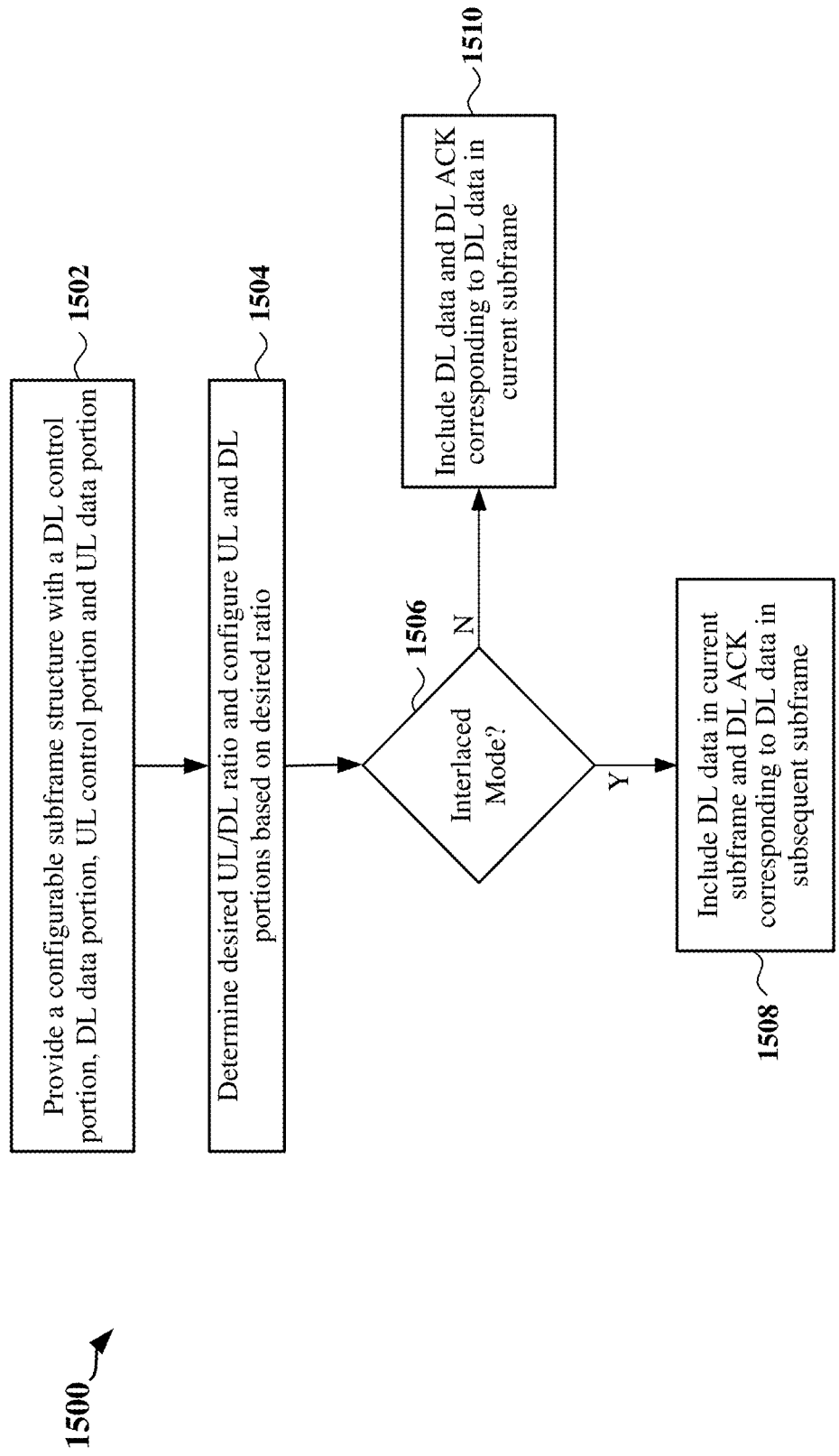
FIG. 15 is a flow chart of a method of implementing an interlace mode of operation utilizing a configurable TDD subframe structure.

FIG. 15 is a flow chart of a method of implementing an interlace mode of operation utilizing a configurable TDD subframe structure. The method may be performed by a scheduling entity. At block 1502, the scheduling entity provides a configurable bi-directional TDD subframe structure for use in configuring one or more subframes. For example, with reference to FIGS. 5 6, 9, 10 and 11, the scheduling entity may provide a configurable subframe structure including a downlink control portion, an uplink control portion, an uplink data portion and a downlink data portion in which the size of one or more of portions may be configurable.

At block 1504, the scheduling entity determines a desired ratio of uplink (UL) information to downlink (DL) information for one or more subframes and configures the size of each of the UL and DL portions of the subframes based on the desired UL/DL ratio. A single UL/DL ratio may be used for both the control and data information or separate UL/DL ratios may be used for the control information and the data information. The UL/DL ratio may be expressed, for example, as a number of symbols allocated to UL control, UL data, DL control and DL data. The number of symbols allocated to UL control and DL control may be asymmetric since the scheduling entity schedules both UL and DL transmissions.

At block 1506, the scheduling entity determines whether an interlaced mode of operation should be utilized for communication with one or more subordinate entities. If an interlaced mode of operation is to be used, at block 1508, the scheduling entity includes DL data in the DL data portion of a current subframe and receives DL ACK information in the UL control portion of a subsequent subframe. If a non-interlaced mode of operation is to be used, at block 1510, the scheduling entity includes DL data in the DL data portion of a current subframe and receives DL ACK information in the UL control portion of the current subframe. In addition, for a non-interlaced mode of operation that supports back-to-back scheduling to the same user, the subframe structure shown in FIG. 10 or 11 may be used, while for a non-interlaced mode of operation that does not support back-to-back scheduling to the same user, the subframe structure shown in FIG. 5, 6, or 9 may be used.

As those skilled in the art will readily appreciate, various aspects described throughout this disclosure may be extended to any suitable telecommunication system, network architecture, and communication standard. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), CDMA2000, Evolution-Data Optimized (EV-DO), IEEE 802.11 (Wi-Fi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect of the disclosure described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-4 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication by a subordinate entity in a wireless communication network, the method comprising:
   communicating between the subordinate entity and a scheduling entity utilizing a time division duplex (TDD) carrier, wherein the TDD carrier comprises a plurality of frames, each comprising a plurality of subframes with a transmission time interval (TTI), each of the plurality of subframes utilizing a configurable subframe structure of TTI duration, wherein the configurable subframe structure comprises a downlink control portion, an uplink control portion, an uplink data portion, and a downlink data portion encapsulated therein;
   separately identifying a respective structure within each of the plurality of subframes utilizing the configurable subframe structure, wherein for a current subframe of the plurality of subframes of TTI duration, separately identifying the respective structure further comprises:
      determining a ratio between uplink information and downlink information within the current subframe, and
      identifying a current structure of the current subframe based on the ratio; and
   communicating between the subordinate entity and the scheduling entity using the current subframe.

2. The method of claim 1, further comprising:
   receiving ratio information related to the ratio from the scheduling entity.

3. The method of claim 2, wherein the receiving the ratio information further comprises:
   receiving the ratio information related to the ratio within a downlink control portion of a previous subframe transmitted prior to the current subframe.

4. The method of claim 2, wherein the receiving the ratio information further comprises:
   receiving the ratio information related to the ratio within a message sent from the scheduling entity.

5. The method of claim 1, wherein determining the ratio further comprises:
   receiving a first number of resources designated for the uplink information and a second number of resources designated for the downlink information; and
   calculating the ratio based on the first number of resources and the second number of resources.

6. The method of claim 1, wherein the identifying the current structure of the current subframe further comprises:
   determining that the downlink data portion occupies both the uplink data portion and the downlink data portion.

7. The method of claim 6, wherein the communicating between the subordinate entity and the scheduling entity using the current subframe further comprises:
   transmitting downlink acknowledgement information within the uplink control portion.

8. The method of claim 1, wherein the identifying the current structure of the current subframe further comprises:
   determining that the uplink data portion occupies both the uplink data portion and the downlink data portion.

9. The method of claim 8, wherein the identifying the current structure of the current subframe further comprises:
   determining that the uplink data portion occupies the uplink data portion, the uplink control portion and the downlink data portion.

10. The method of claim 9, wherein the communicating between the subordinate entity and the scheduling entity further comprises:
    receiving uplink acknowledgement information within the downlink control portion.

11. The method of claim 1, wherein respective sizes of the uplink control portion and the downlink control portion are asymmetric.

12. The method of claim 1, wherein the configurable subframe structure of TTI duration further comprises the downlink control portion, a guard period following the downlink control portion, the uplink control portion following the guard period, the uplink data portion following the uplink control portion and the downlink data portion following the uplink data portion encapsulated therein.

13. The method of claim 12, wherein the configurable subframe structure of TTI duration further comprises an additional guard period between the uplink data portion and the downlink data portion encapsulated therein.

14. The method of claim 1, wherein the configurable subframe structure of TTI duration further comprises the downlink control portion, a first guard period following the downlink control portion, the uplink data portion following the first guard period, the uplink control portion following the uplink data portion, a second guard period following the uplink control portion and the downlink data portion following the second guard period encapsulated therein.

15. The method of claim 1, wherein the configurable subframe structure of TTI duration further comprises the downlink control portion, the downlink data portion following the downlink control portion, a first guard period following the downlink data portion, the uplink data portion following the first guard period, the uplink control portion following the uplink data portion and a second guard period following the uplink control portion encapsulated therein.

16. The method of claim 1, wherein the configurable subframe structure of TTI duration further comprises the downlink control portion, the downlink data portion following the downlink control portion, a first guard period following the downlink data portion, the uplink control portion following the first guard period, the uplink data portion following the uplink control portion and a second guard period following the uplink data portion encapsulated therein.

17. The method of claim 1, further comprising:
    providing an interlaced mode of operation in which downlink data information is included in the current subframe and downlink acknowledgement information corresponding to the downlink data information is included in a different subframe transmitted subsequent to the current subframe.

18. The method of claim 1, further comprising:
    providing a non-interlaced mode of operation in which both downlink data information and downlink acknowledgement information corresponding to the downlink data information is included in the current subframe.

19. The method of claim 1, wherein the communicating between the subordinate entity and the scheduling entity comprises:
receiving control information and uplink acknowledgement information within the downlink control portion of the current subframe.

20. A subordinate entity in a wireless communication network, comprising:
a processor;
a memory communicatively coupled to the processor; and
a transceiver communicatively coupled to the processor and configured to communicate with a scheduling entity utilizing a time division duplex (TDD) carrier, wherein the TDD carrier comprises a plurality of frames, each comprising a plurality of subframes with a transmission time interval (TTI), each of the plurality of subframes utilizing a configurable subframe structure of TTI duration, wherein the configurable subframe structure comprises a downlink control portion, an uplink control portion, an uplink data portion, and a downlink data portion encapsulated therein, wherein the processor and the memory are configured to:
separately identify a respective structure within each of the plurality of subframes utilizing the configurable subframe structure, wherein for a current subframe of the plurality of subframes of TTI duration, separately identifying the respective structure further comprises:
determining a ratio between uplink information and downlink information within the current subframe, and
identifying a current structure of the current subframe based on the ratio; and
communicate between the subordinate entity and the scheduling entity using the current subframe via the transceiver.

21. The subordinate entity of claim 20, wherein the processor and the memory are further configured to:
receive ratio information related to the ratio from the scheduling entity within a downlink control portion of a previous subframe transmitted prior to the current subframe.

22. The subordinate entity of claim 20, wherein the processor and the memory are configured to:
receive ratio information related to the ratio within a message sent from the scheduling entity.

23. The subordinate entity of claim 20, wherein the processor and the memory are further configured to:
receive from the scheduling entity a first number of resources designated for the uplink information and a second number of resources designated for the downlink information; and
calculate the ratio based on the first number of resources and the second number of resources.

24. The subordinate entity of claim 20, wherein the processor and the memory are further configured to:
determine that the downlink data portion occupies both the uplink data portion and the downlink data portion for the current subframe.

25. The subordinate entity of claim 20, wherein the processor and the memory are further configured to:
determine that the uplink data portion occupies both the uplink data portion and the downlink data portion for the current subframe.

26. The subordinate entity of claim 23, wherein the processor and the memory are further configured to:
determine that the uplink data portion occupies the uplink data portion, the uplink control portion and the downlink data portion for the current subframe.

27. A subordinate entity apparatus in a wireless communication network comprising:
means for communicating with a scheduling entity utilizing a time division duplex (TDD) carrier, wherein the TDD carrier comprises a plurality of frames, each comprising a plurality of subframes with a transmission time interval (TTI), each of the plurality of subframes utilizing a configurable subframe structure of TTI duration , wherein the configurable subframe structure comprises a downlink control portion, an uplink control portion, an uplink data portion, and a downlink data portion encapsulated therein;
means for separately identifying a respective structure within each of the plurality of subframes utilizing the configurable subframe structure, wherein for a current subframe of the plurality of subframes of TTI duration, the means for separately identifying the respective structure further comprises:
means for determining a ratio between uplink information and downlink information within the current subframe, and
means for identifying a current structure of the current subframe based on the ratio; and
means for communicating between the subordinate entity and the scheduling entity using the current subframe.

28. The subordinate entity apparatus of claim 27, further comprising:
means for receiving ratio information related to the ratio from the scheduling entity within a downlink control portion of a previous subframe transmitted prior to the current subframe.

29. The subordinate entity apparatus of claim 27, further comprising:
means for receiving ratio information related to the ratio within a message sent from the scheduling entity.

30. The subordinate entity apparatus of claim 27, wherein the means for determining a ratio further comprises:
means for receiving from the scheduling entity a first number of resources designated for the uplink information and a second number of resources designated for the downlink information; and
means for calculating the ratio based on the first number of resources and the second number of resources.

* * * * *